(12) United States Patent
Kimberley

(10) Patent No.: US 9,346,478 B2
(45) Date of Patent: May 24, 2016

(54) COLLAPSIBLE FOUR WHEEL GOLF CART

(71) Applicant: Kevin Kimberley, North Vancouver (CA)

(72) Inventor: Kevin Kimberley, North Vancouver (CA)

(*) Notice: Subject to any disclaimer, the term of this patent is extended or adjusted under 35 U.S.C. 154(b) by 26 days.

(21) Appl. No.: 13/841,828

(22) Filed: Mar. 15, 2013

(65) Prior Publication Data

US 2014/0197619 A1 Jul. 17, 2014

Related U.S. Application Data

(63) Continuation-in-part of application No. 13/741,279, filed on Jan. 14, 2013.

(51) Int. Cl.
*A63B 55/08* (2006.01)
*B62B 5/04* (2006.01)
*B62B 3/02* (2006.01)

(52) U.S. Cl.
CPC .............. *B62B 5/0433* (2013.01); *B62B 3/02* (2013.01); *B62B 5/0485* (2013.01); *B62B 2202/404* (2013.01); *B62B 2205/02* (2013.01)

(58) Field of Classification Search
None
See application file for complete search history.

(56) References Cited

U.S. PATENT DOCUMENTS

| 5,232,065 A | 8/1993 | Cotton |
| 5,857,684 A | 1/1999 | Liao et al. |
| 6,283,238 B1 | 9/2001 | Royer et al. |
| 6,942,238 B1 | 9/2005 | DeCarlo |
| 7,607,724 B2 * | 10/2009 | Dickie ............. B62B 7/06 297/16.1 |
| 2006/0192366 A1 * | 8/2006 | Kimberley .............. 280/651 |
| 2008/0042474 A1 * | 2/2008 | Dickie ............. B62B 7/06 297/16.2 |
| 2010/0052275 A1 * | 3/2010 | Reimers et al. ........ 280/47.26 |
| 2011/0215542 A1 | 9/2011 | Wang |

FOREIGN PATENT DOCUMENTS

GB        1455114 A  * 11/1976

* cited by examiner

*Primary Examiner* — Brodie Follman
*Assistant Examiner* — Hilary L Johns
(74) *Attorney, Agent, or Firm* — Cameron IP

(57) ABSTRACT

A collapsible golf cart comprises a frame member, a handle, and a carriage. The handle is pivotably coupled to the frame and the frame is pivotably coupled to the carriage. The carriage has a pair of front wheels and a pair of rear wheels. The golf cart is moveable between an extended configuration in which corresponding ones of the front wheels and rear wheels are offset with respect to one another, and a collapsed configuration in which corresponding ones of the fronts wheels and rear wheels are substantially aligned with respect to one another.

13 Claims, 27 Drawing Sheets

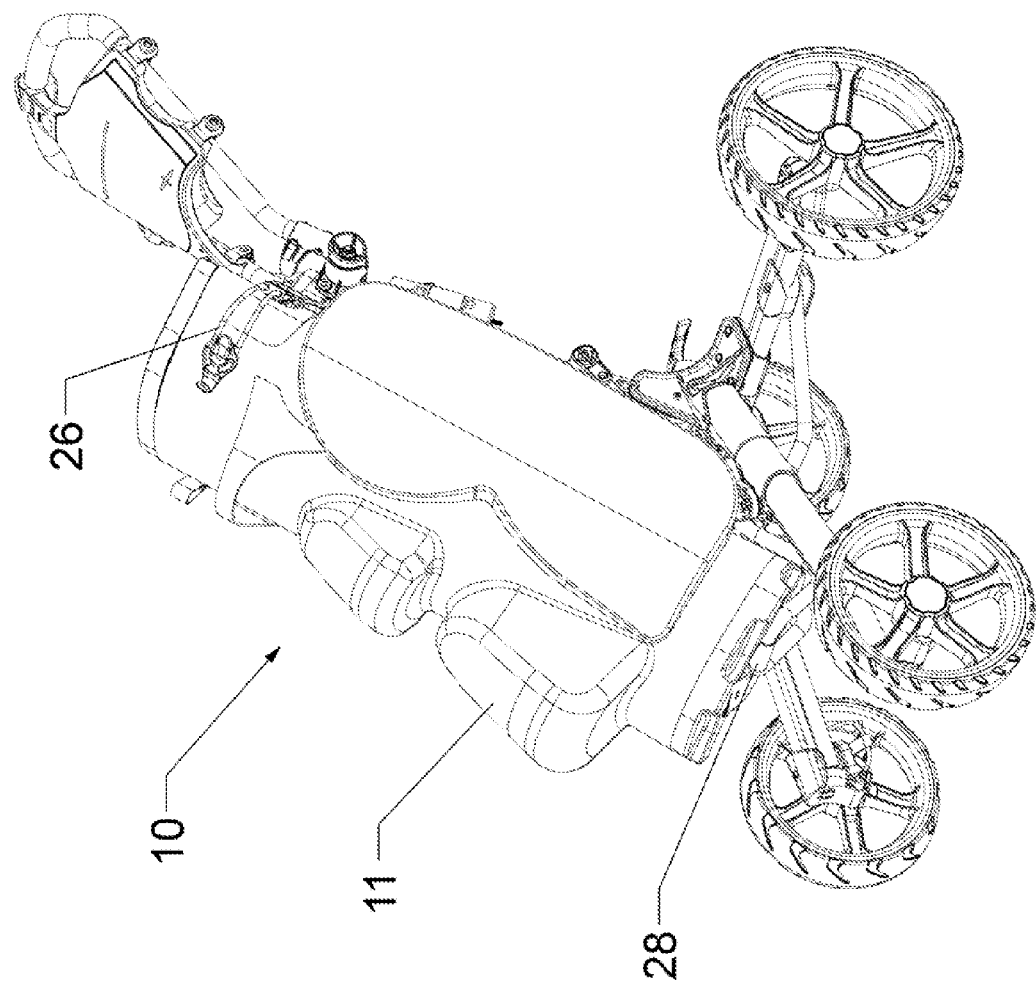

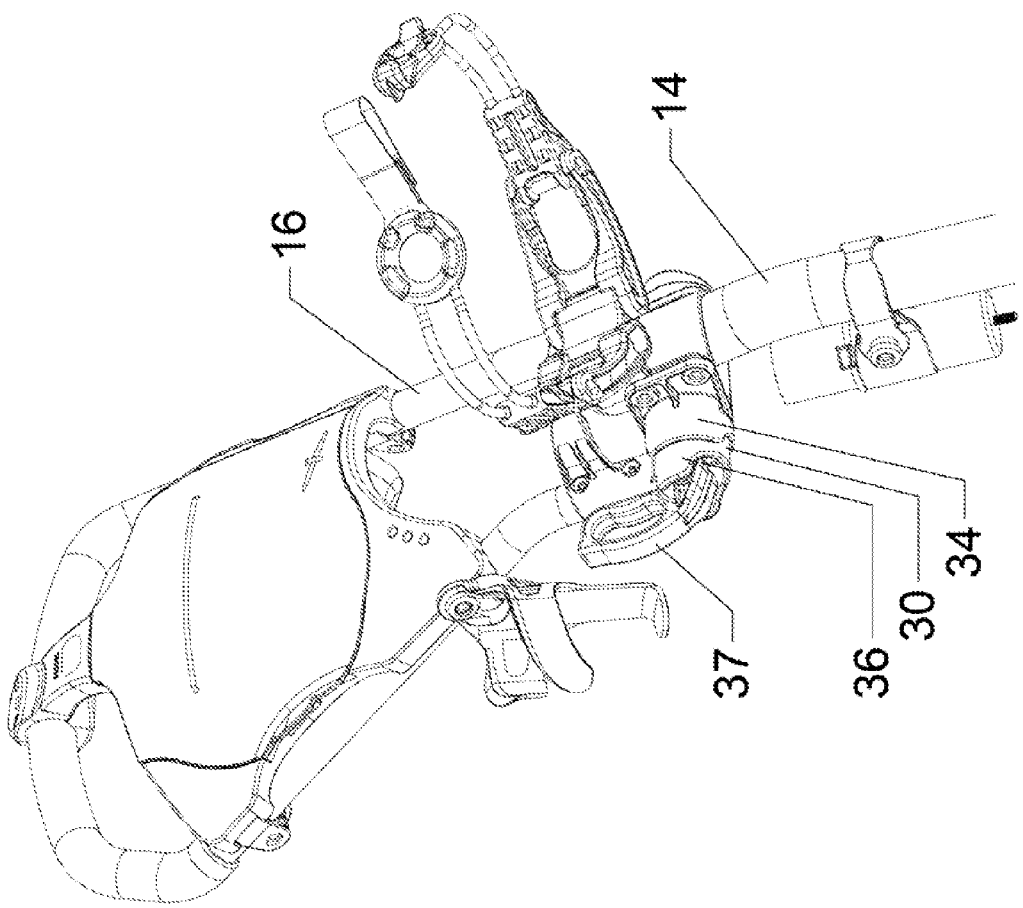

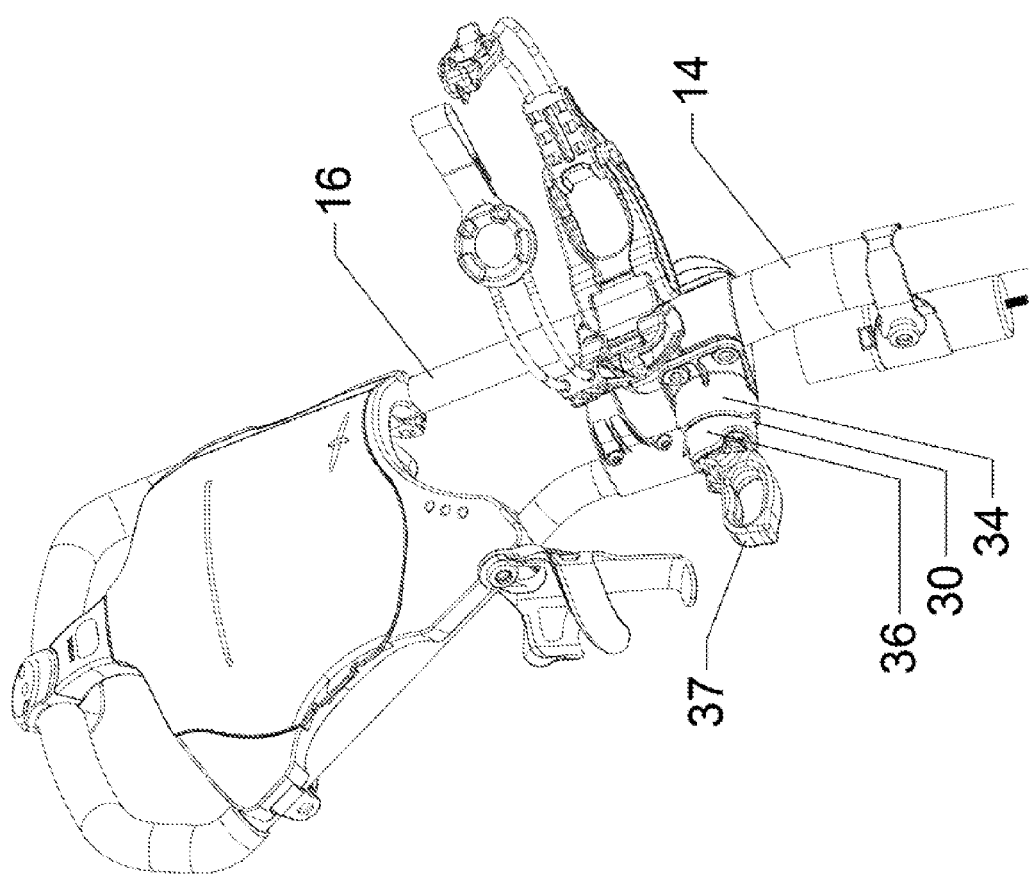

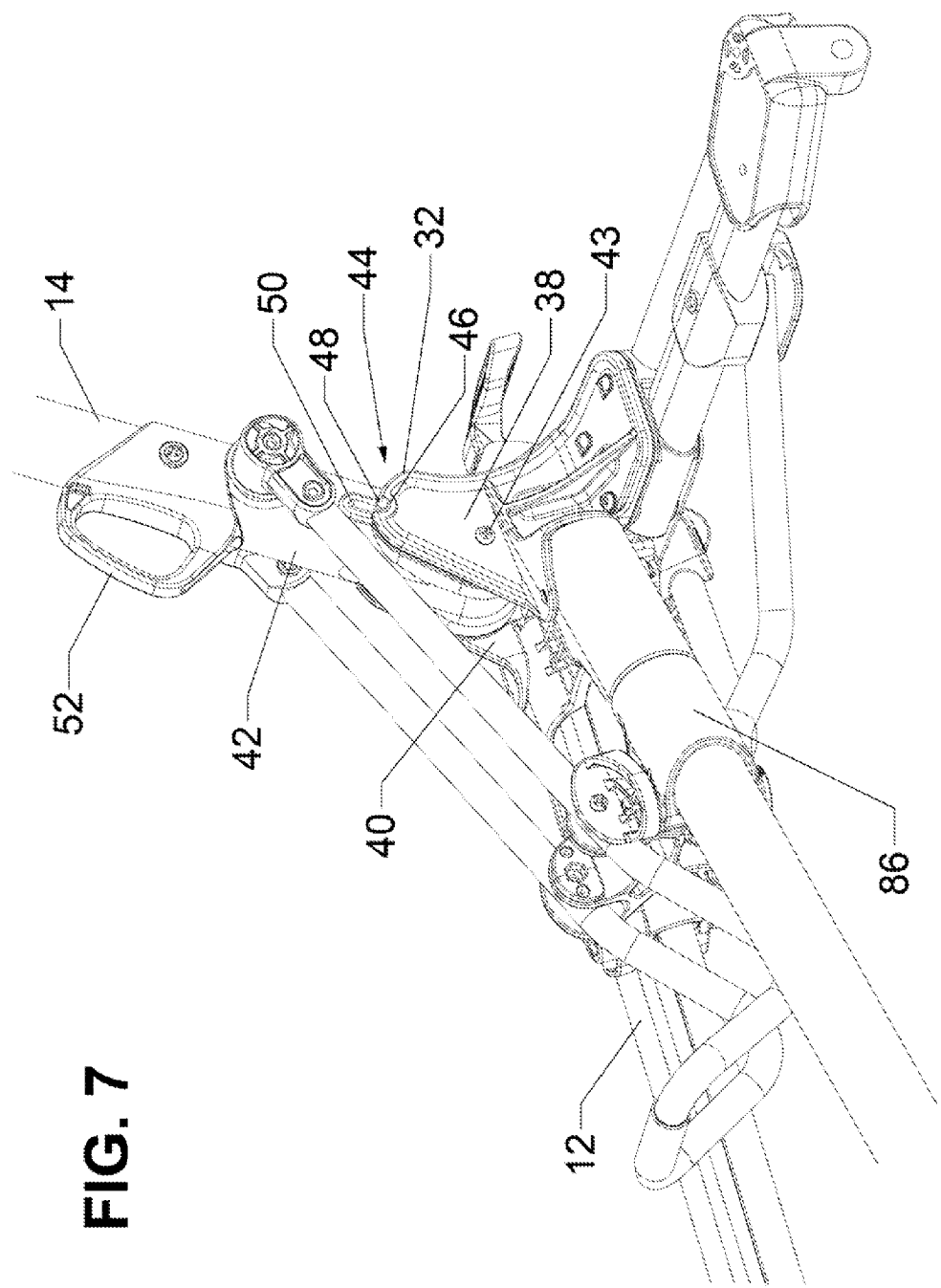

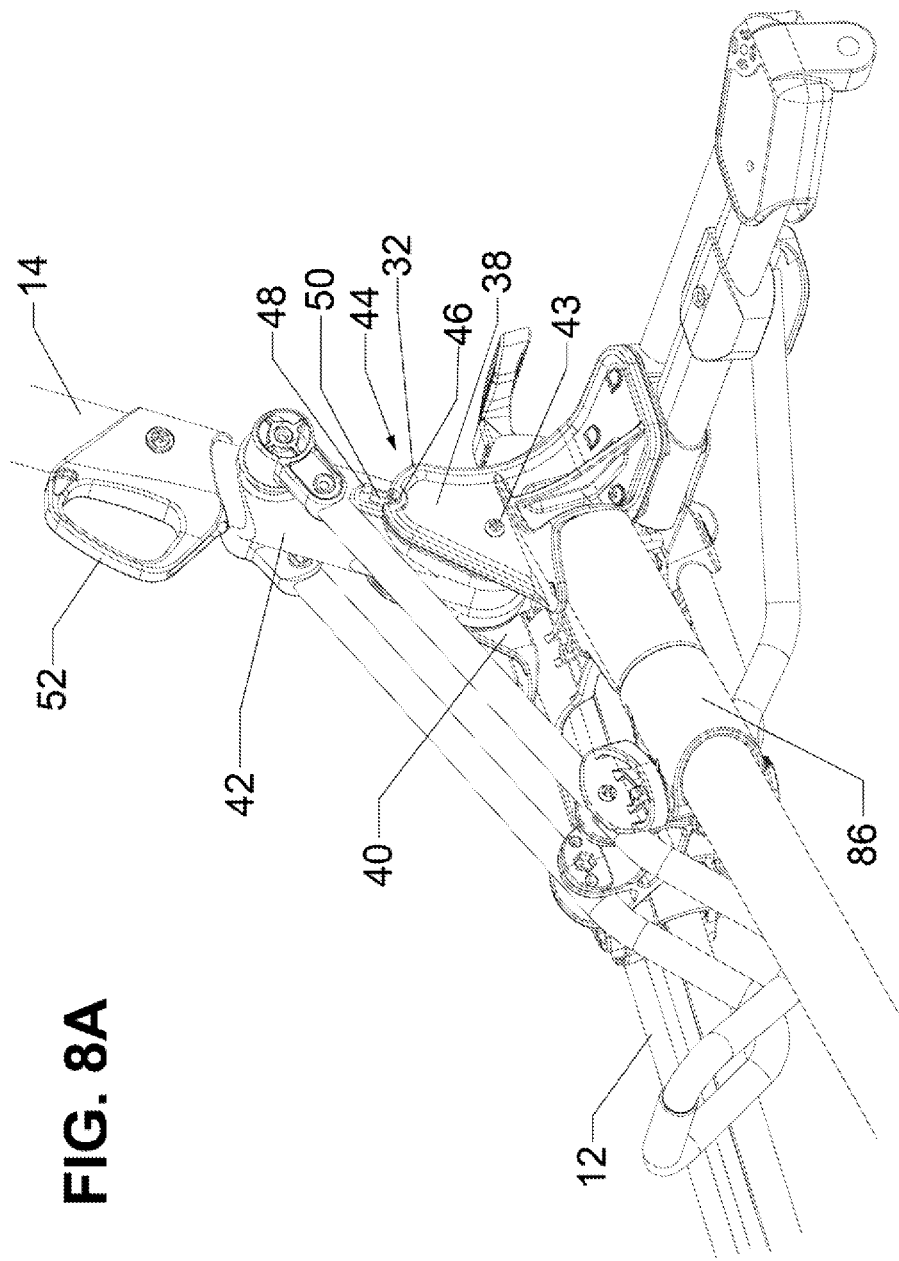

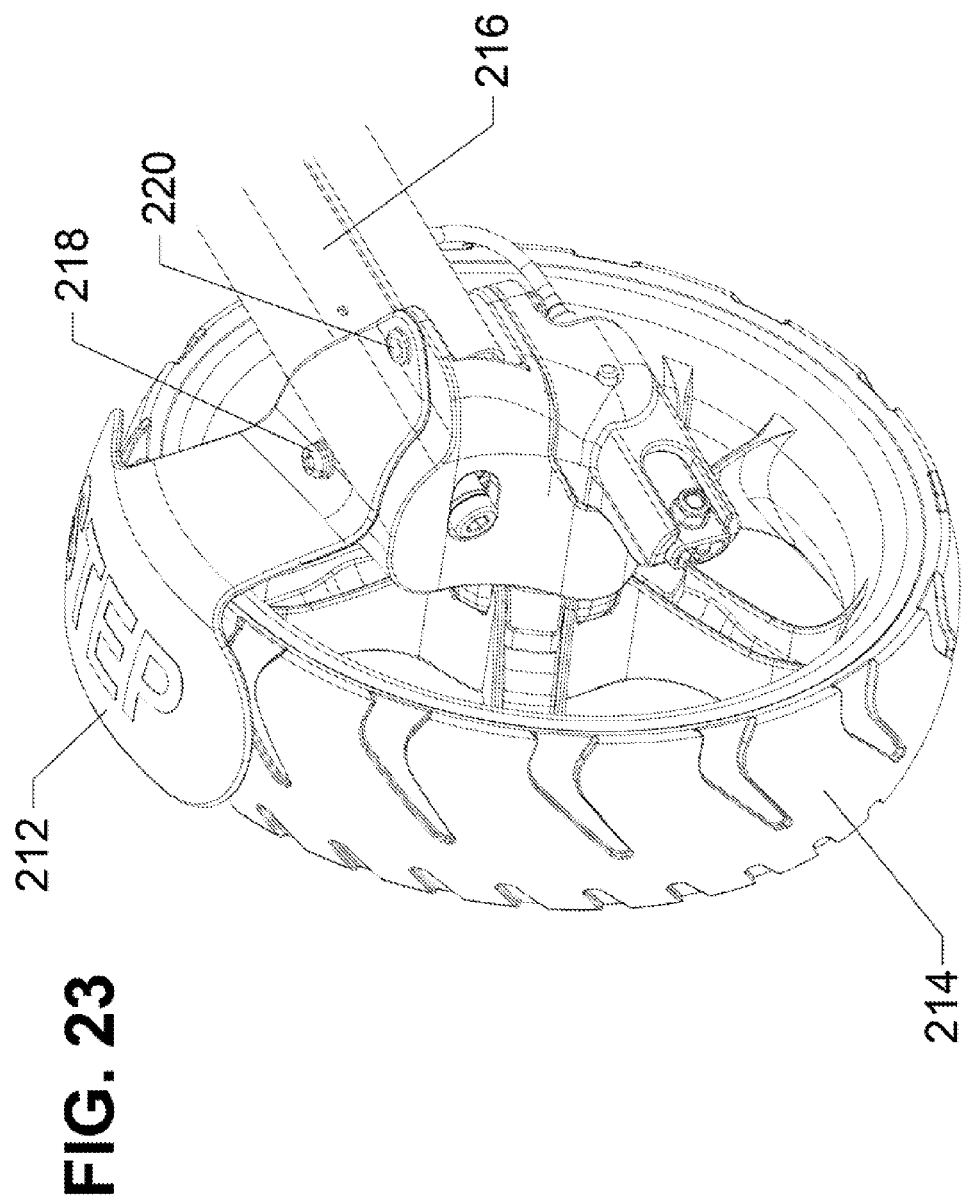

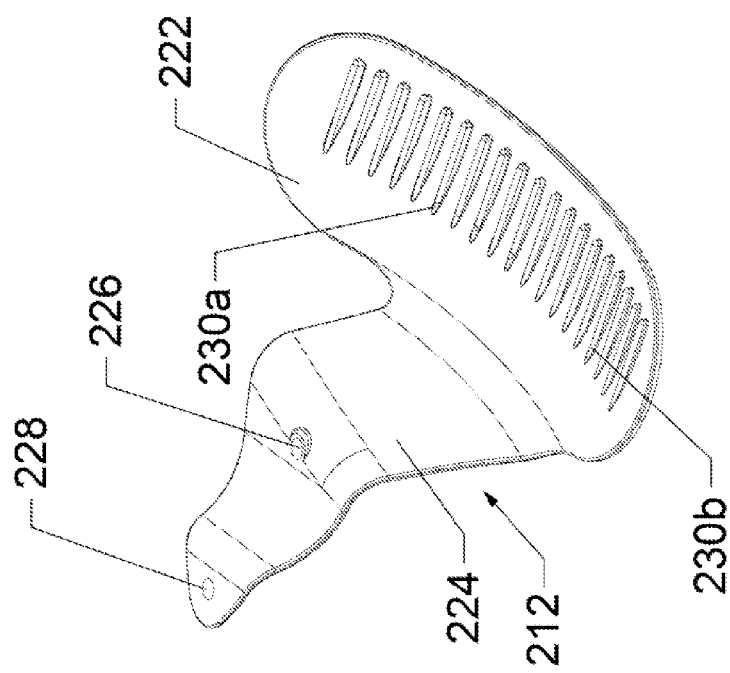
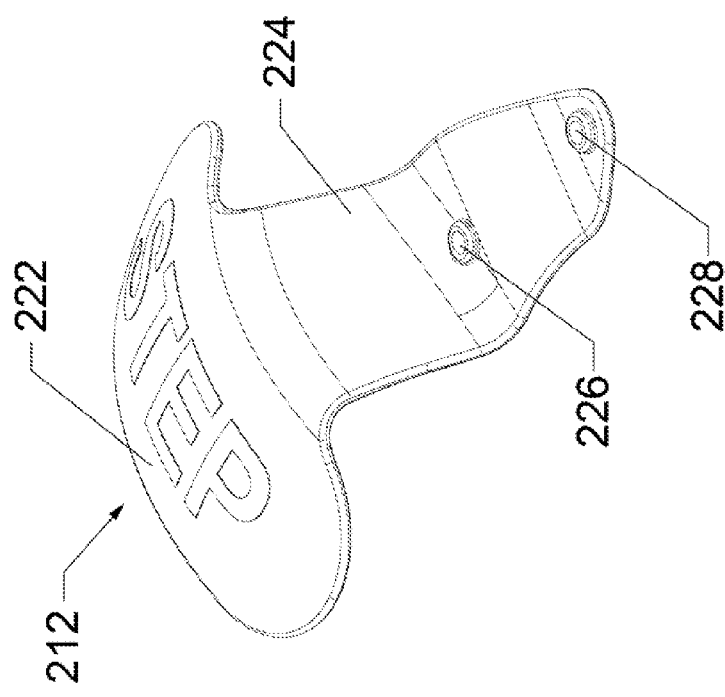

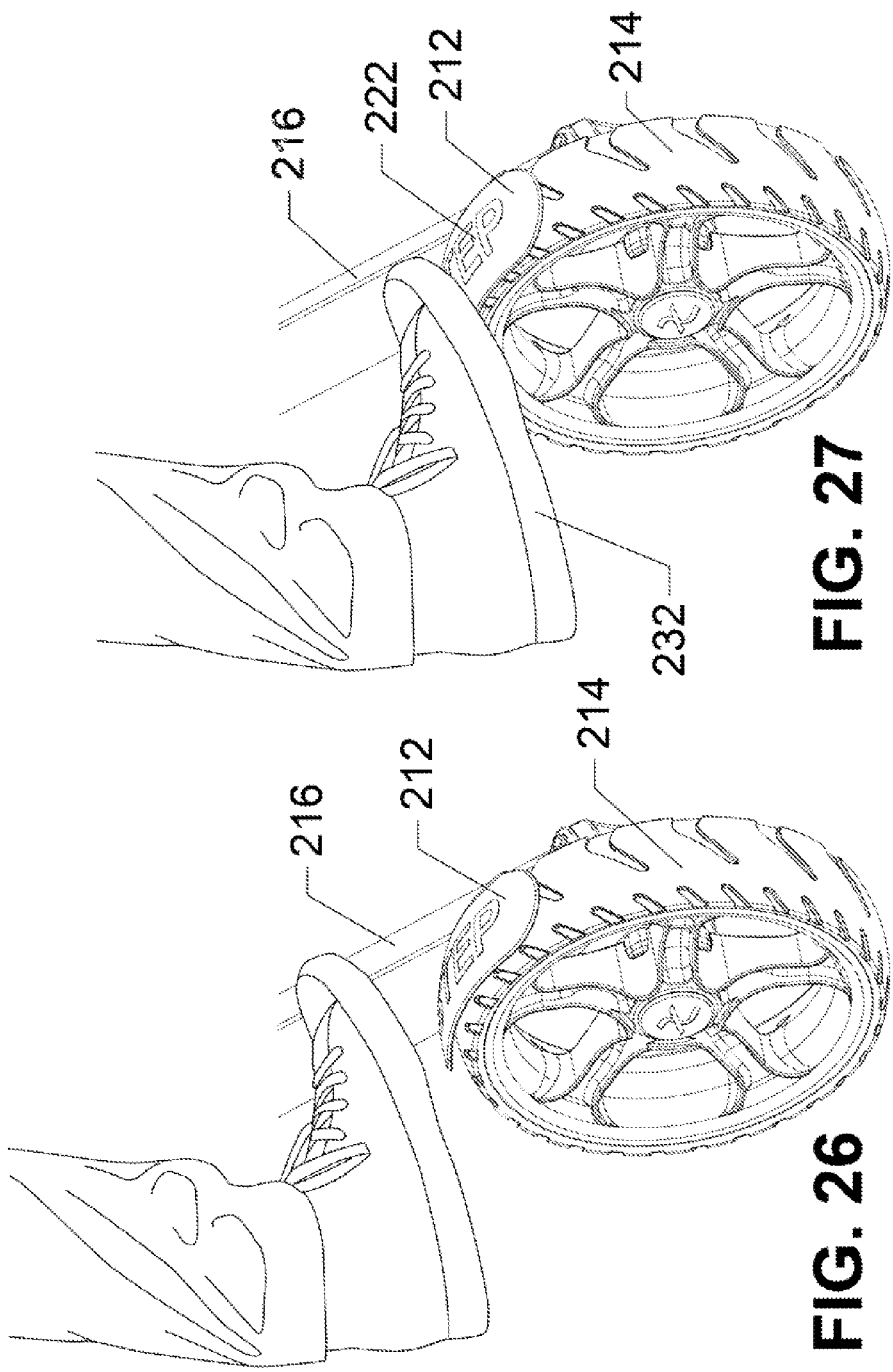

COLLAPSIBLE FOUR WHEEL GOLF CART

CROSS-REFERENCE TO RELATED APPLICATION

This application is a continuation-in-part application of application Ser. No. 13/741,279 filed in the United States Patent and Trademark Office on Jan. 14, 2013 and to which priority is claimed.

BACKGROUND OF THE INVENTION

1. Field of the Invention

The present invention relates to golf carts and, in particular, to a collapsible four wheel golf cart.

2. Description of the Related Art

Golf is a sport which requires players to have a large selection of clubs available for use in a variety of situations. Players therefore frequently use a golf cart to transport their selection of clubs during a game of golf. However, golf carts are often bulky. This makes the golf carts difficult to store and transport to and from the golf course.

To overcome the above mentioned problem, collapsible golf carts with foldable or removable parts have been developed. For example, United States Patent Application Publication Number 2010/0052275 which was published on Mar. 4, 2010 in the name of Reimers et al. discloses a collapsible golf cart which includes a four wheel carriage, a bag support frame, and a handle. The bag support frame includes a base frame and a pivotally attached torso frame. A slider block on the base frame, in conjunction with pivoting of the torso frame, provides a mechanism for moving the golf bag cart between an extended configuration and collapsed configuration. The handle is pivotally securable at multiple pivot angles.

However, existing collapsible golf carts tend to be cumbersome to collapse and the compactness of the collapsed configuration is often limited. There is accordingly a need for a golf cart that can be easily collapsed into a compact structure.

SUMMARY OF THE INVENTION

There is accordingly provided a collapsible golf cart comprising a frame member, a handle, and a carriage. The handle is coupled to the frame and the frame is pivotably coupled to the carriage. The carriage has a pair of front wheels and a pair of rear wheels. The golf cart is moveable between an extended configuration in which corresponding ones of the front wheels and rear wheels are offset with respect to one another, and a collapsed configuration in which corresponding ones of the fronts wheels and rear wheels are substantially aligned with respect to one another. The handle may be pivotably coupled to the frame member. A releasably lockable articulation may pivotably couple the handle to the frame member. Likewise a releasably lockable articulation may pivotably couple the frame to the carriage.

The carriage may have a pair of front wheel strut assemblies and a pair of rear wheel strut assemblies. Respective front wheels may be mounted on each of the front wheel strut assemblies. Respective rear wheels may be mounted on each of the rear wheel strut assemblies. A collapsing mechanism may be movable along the front wheel strut assemblies between a first position and a second position. When the collapsing mechanism is in the first position the golf cart may be in the extended configuration. When the collapsing mechanism is in the second position the golf cart may be in the collapsed configuration.

The front wheel strut assemblies may each include a respective load bearing strut and a respective positioning strut. The load bearing strut of each front wheel strut assembly may be adjustable. The front wheel strut assemblies may be independently pivotable and the front wheels may be self adjustable. The rear wheel strut assemblies may each include a respective load bearing strut and a respective positioning strut which are both pivotably connected to a respective rear wheel mount. The geometry of the rear wheel strut assemblies may change when the collapsible golf cart is moved between the extended configuration to the collapsed configuration such that each rear wheel mount is longitudinally aligned with its corresponding load bearing strut when the golf cart is in the extended configuration and each rear wheel mount is longitudinally aligned with its corresponding positioning strut when the golf cart is in the collapsed configuration.

The rear wheel struts may each be coupled to the collapsing mechanism by a corresponding linking rod such that motion is transmitted to the rear wheel strut assemblies when the collapsing mechanism moves along the front wheel strut assemblies. The frame member may be coupled to the collapsing mechanism such that pivoting of the frame member relative to the carriage causes the collapsing mechanism to move along the front wheel strut assemblies. A cradle for a golf bag couples the frame member to the collapsing mechanism. There may be a releasable locking mechanism for restricting movement of the collapsing mechanism.

There may be a brake mechanism for arresting rotation of one of the front wheels. The brake mechanism may include a brake shoe provided with a plurality of ridges which engage the front wheel when the brake mechanism is in an engaged position. The brake mechanism may include a mounting plate for mounting the brake mechanism to the golf cart. The brake mechanism may be resilient and biased towards a released position. The brake mechanism may be actuated to the engaged position by applying a downward force to the brake shoe.

There is also provided a method of constructing a collapsible golf cart. The method comprises constructing a carriage having a pair of pivotable front wheel strut assemblies and a pair of pivotable rear wheel strut assemblies. A front wheel is mounted on each of the front wheel strut assemblies and a rear wheel is mounted on each of the front wheel strut assemblies. A pivotable frame member is coupled to the carriage and a handle is coupled to the frame member. A movable collapsing mechanism is mounted on the front wheel strut assemblies such that the collapsing mechanism is movable along the front wheel strut assemblies between a first position and a second position. The collapsing mechanism is coupled to the rear wheel strut assemblies such that the collapsing mechanism transmits motion to the rear wheel strut assemblies when the collapsing mechanism moves along the front wheel strut assemblies between a first position and a second position. The collapsing mechanism is also coupled to the frame member such that pivoting of the frame member causes the collapsing mechanism to move between the first position and the second position. When the collapsing mechanism is in the first position the golf cart is in an extended configuration in which corresponding ones of the front wheels and rear wheels are offset with respect to one another, and when the collapsing mechanism is in the second position the golf cart is in a collapsed configuration in which corresponding ones of the front wheels and rear wheels are substantially aligned with respect to one another. The collapsing mechanism may be coupled to the frame member by using a cradle for a golf bag to couple the frame member to the collapsing mechanism.

Constructing the carriage may include constructing the rear wheel strut assemblies to each include a respective load bearing strut and a respective positioning strut which are both pivotably connected to a respective rear wheel mount. A geometry of the rear wheel strut assemblies may change when the collapsible golf cart is moved between the extended configuration and the collapsed configuration such that each rear wheel mount is longitudinally aligned with its corresponding load bearing strut when the golf cart is in the extended configuration and each rear wheel mount is longitudinally aligned with its corresponding positioning strut when the golf cart is in the collapsed configuration.

BRIEF DESCRIPTIONS OF DRAWINGS

The invention will be more readily understood from the following description of the embodiments thereof given, by way of example only, with reference to the accompanying drawings, in which:

FIGS. 1A and 1B are perspective views of an improved collapsible golf cart in an extended configuration;

FIG. 5 is a perspective view of an articulation of the golf cart of FIG. 1A which pivotably connects a handle of the golf cart to a elongate frame member of the golf cart with a locking mechanism of the articulation engaged;

FIG. 6 is a perspective view of the articulation of the golf cart of FIG. 1A which pivotably connects a handle of the golf cart to a elongate frame member of the golf cart with the locking mechanism of the articulation released;

FIG. 7 is a perspective view of an articulation of the golf cart of FIG. 1A which pivotably connects the elongate frame member of the golf cart to a carriage of the golf cart with a locking mechanism of the articulation engaged;

FIGS. 8A and 8B are perspectives view of the articulation of the golf cart of FIG. 1A which pivotably connects the elongate frame member of the golf cart to a carriage of the golf cart with a locking mechanism of the articulation released;

FIG. 23 is a perspective view of a brake mechanism and a front wheel of the golf cart of FIG. 22;

FIG. 24 is a top view of a brake shoe of the golf cart of FIG. 22;

FIG. 25 is a bottom view of a brake shoe of the golf cart of FIG. 22;

FIG. 26 is a perspective view of the brake mechanism of the golf cart of FIG. 22 in a released position; and FIG. 27 is a perspective view of the brake mechanism of the golf cart of FIG. 22 in an engaged position.

DESCRIPTIONS OF THE PREFERRED EMBODIMENTS

Figure 1A:
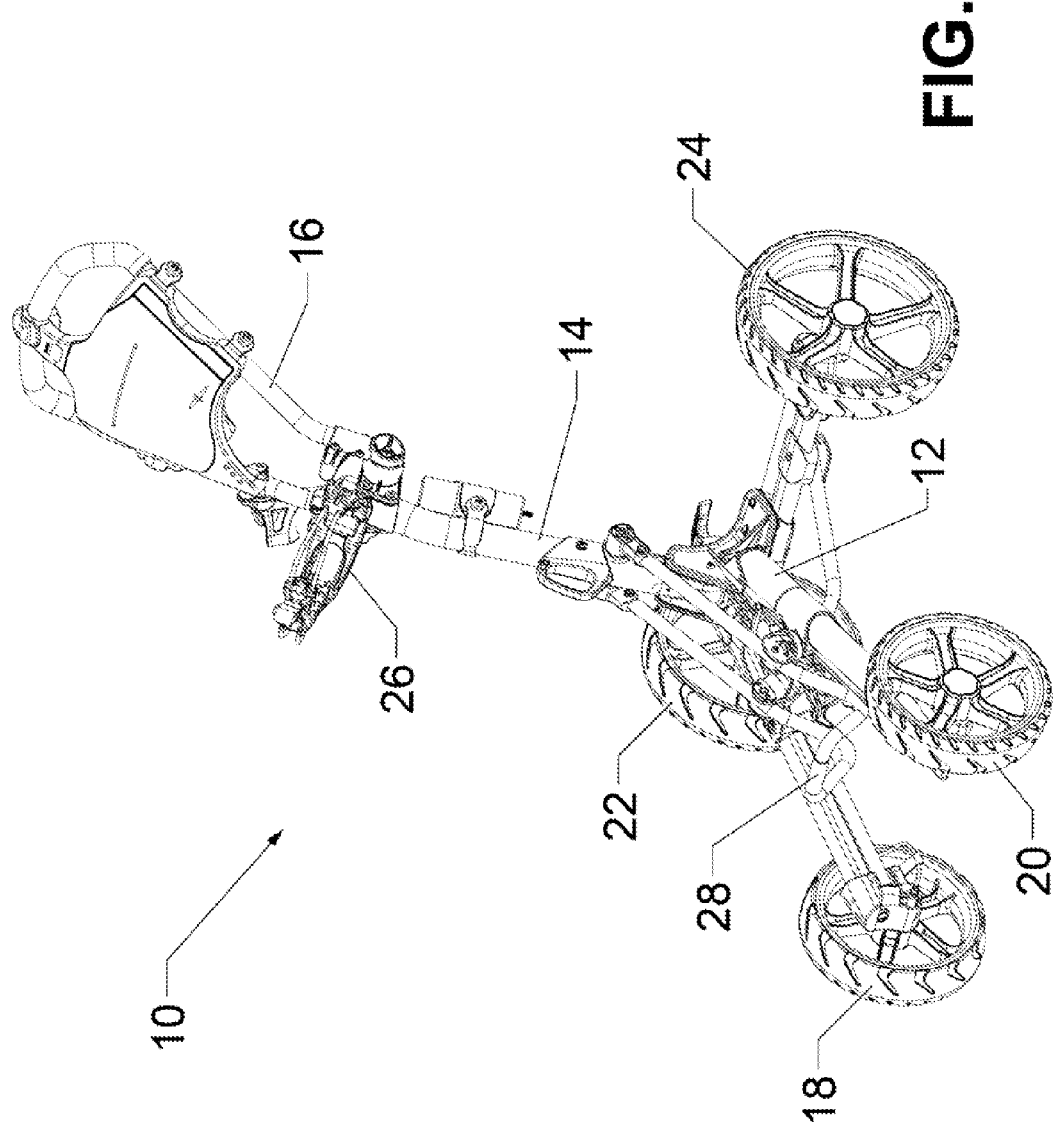

Referring to the drawings and first to FIG. 1A, an improved collapsible four wheel golf cart 10 is shown. The golf cart 10 generally includes a four wheel carriage 12, an elongate frame member 14 pivotably connected to and extending from the carriage, a handle 16 pivotably connected to the elongate frame member opposite of the carriage, a pair of front wheels 18 and 20 mounted to the carriage, and pair of rear wheels 22 and 24 mounted to the carriage. In this example, the golf cart 10 also includes a collar 26 and a cradle 28 which function to support a golf bag 11 as shown in FIG. 1B. The collar 26 is mounted on the elongate frame member 14 near the handle 16 and the cradle 28 is mounted on the elongate frame member 14 near the carriage 12.

Figure 2:
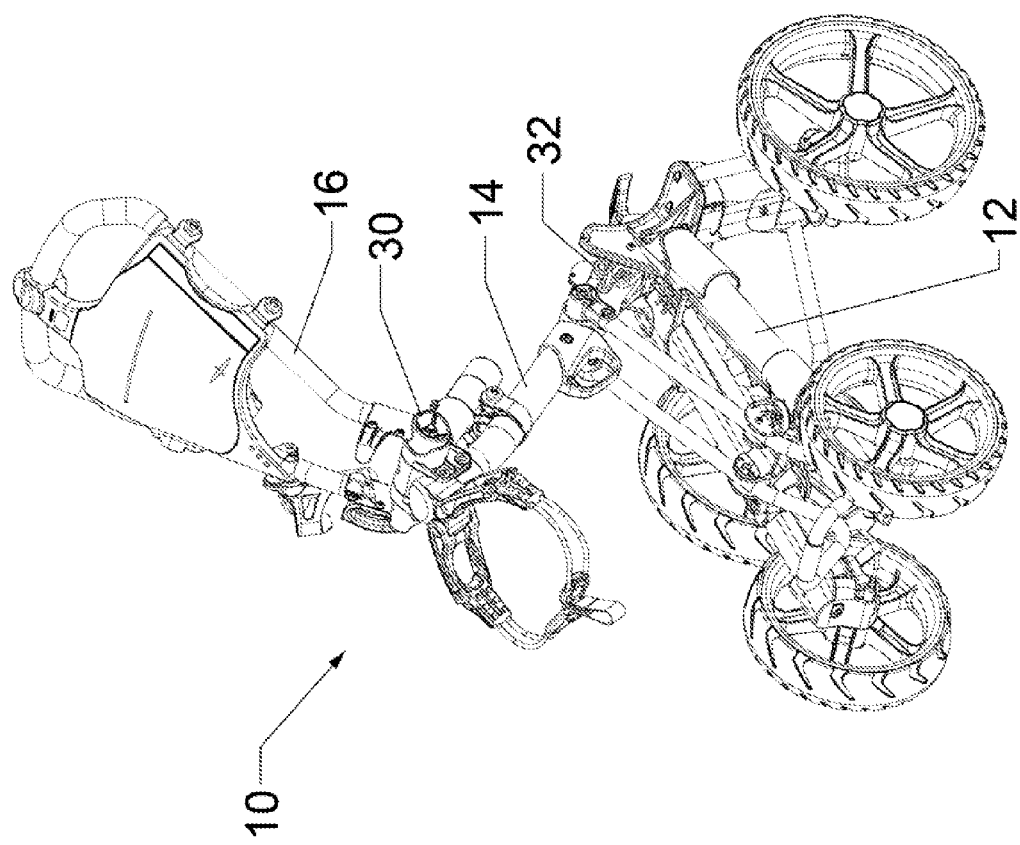
FIG. 2 is a perspective view of the collapsible golf cart of FIG. 1A in a first intermediate configuration.
Figure 3:
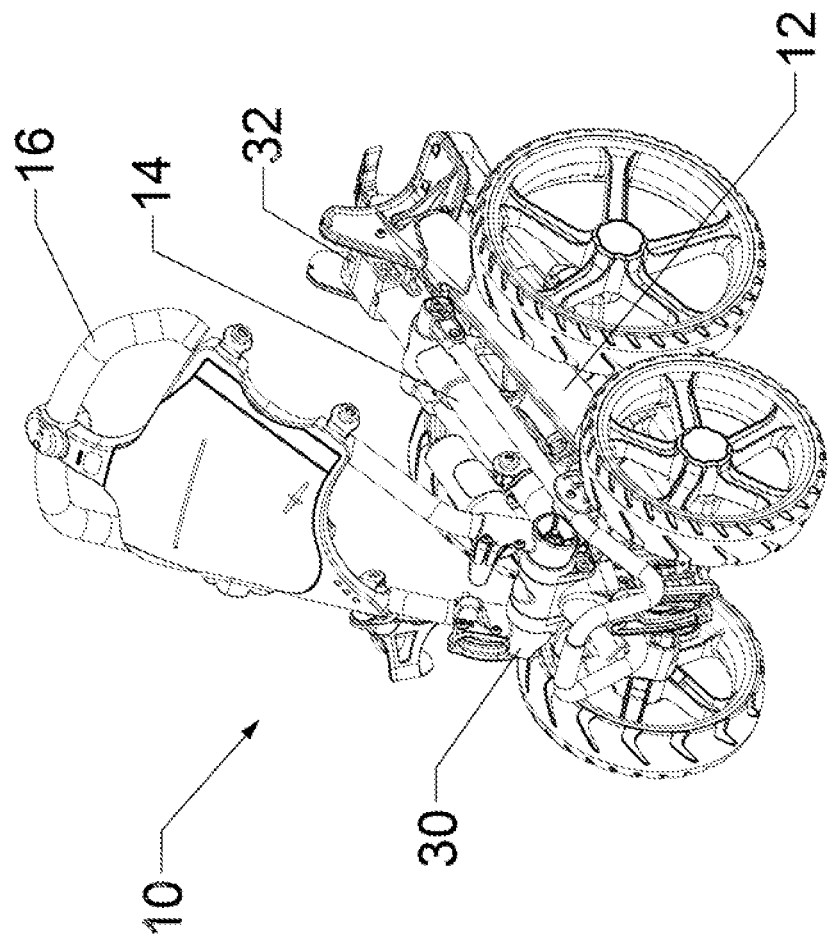
FIG. 3 is a perspective view of the collapsible golf cart of FIG. 1A in a second intermediate configuration.
Figure 4:
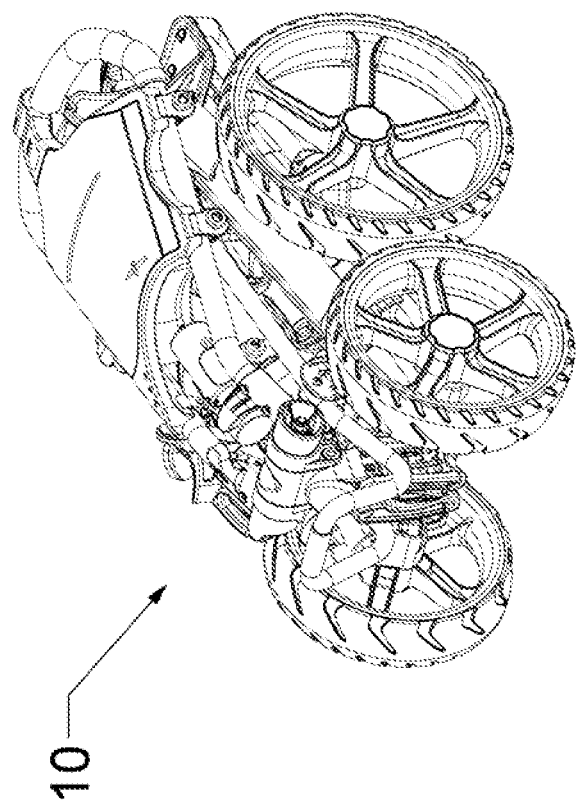
FIG. 4 is a perspective view of the collapsible golf cart of FIG. 1A in a collapsed configuration.

The golf cart 10 is shown in an extended configuration in FIGS. 1A and 1B which is the configuration for normal usage. However, the golf cart 10 is moveable between the extended configuration and a collapsed configuration which is shown in FIG. 4. Between the extended configuration and the collapsed configuration the golf cart 10 moves through intermediate configurations such as the intermediate configurations shown in FIGS. 2 and 3. To move the golf cart 10 from the extended configuration to the collapsed configuration the handle 16 is pivoted about an articulation 30, shown in FIGS. 2 and 3, which pivotably couples the handle to the elongate frame member 14. It is also necessary to pivot the elongate frame member 14 about an articulation 32 which pivotably connects the elongate frame member to the carriage 12.

The articulation 30 which pivotably couples the handle 16 to the elongate frame member 14 is best shown in FIGS. 5 and 6. The articulation 30 includes a sleeve 34 which is mounted on the elongate frame member 14. The sleeve 34 receives a cylindrical portion 36 of the handle 16. The cylindrical portion 36 of the handle 16 rotates within the sleeve 34 when the handle 16 is pivoted relative to the elongate frame member 14. There is also a releasable locking mechanism (not shown) which is actuated by a lever 37. The locking mechanism releasably locks the articulation 30 in position by restricting rotation of the cylindrical portion 36 of the handle 16 within the sleeve 34 and thereby restricting pivoting of the handle 16 relative to the elongate frame member 14. FIG. 5 shows the lever 37 in a locked position in which the locking mechanism is engaged and the handle 16 cannot pivot relative to the elongate frame member 14. FIG. 6 shows the lever in a released position in which the locking mechanism is released and the handle 16 can pivot relative to the elongate frame member 14. The locking mechanism may be similar to the type disclosed in U.S. Pat. No. 7,137,644 which issued on Nov. 26, 2006 to Kimberley and the full disclosure of which is incorporated herein by reference.

Figure 8B:
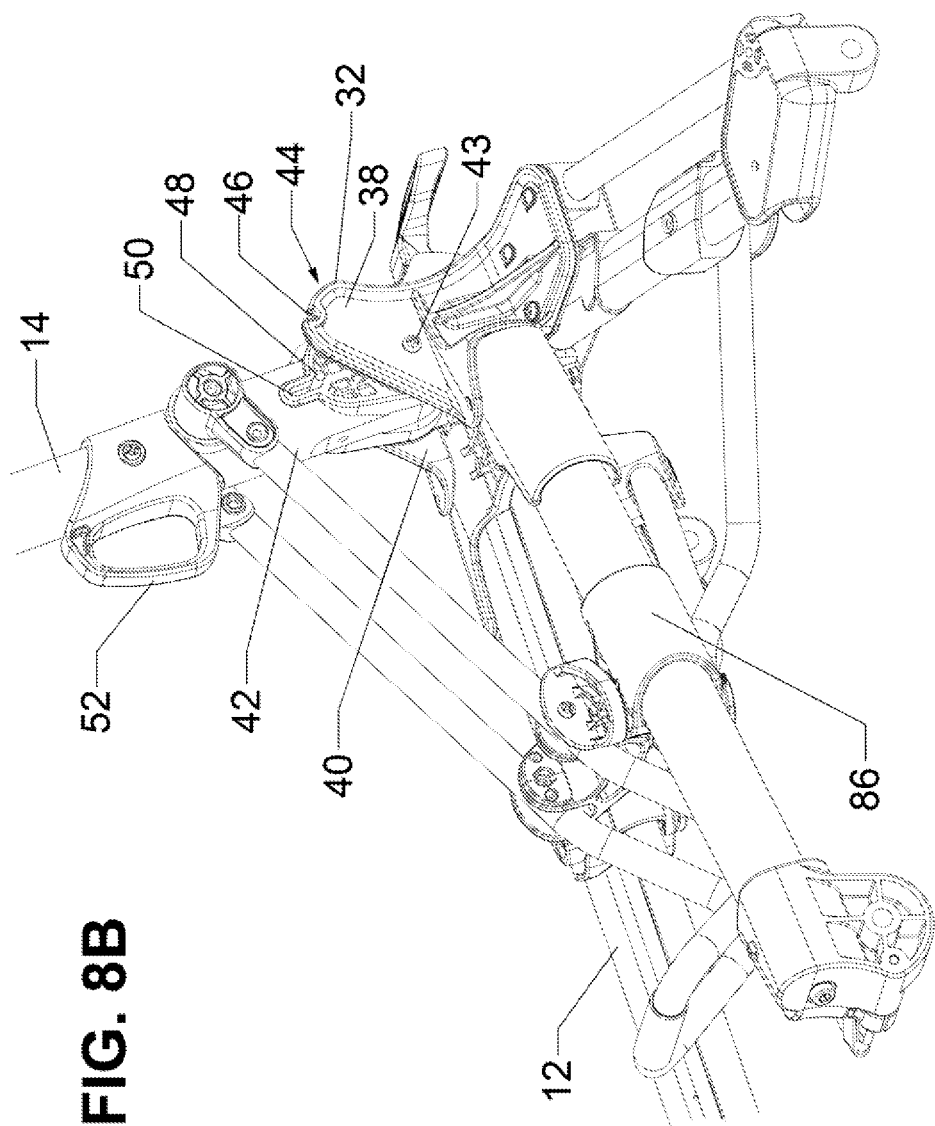

The articulation 32 which pivotably couples the elongate frame member 14 to the carriage 12 is best shown FIGS. 7, 8A and 8B. The articulation 32 includes a pair of spaced-apart L-shaped brackets 38 and 40 on the carriage 12. The articulation 32 also includes a socket 42 which is mounted on a pivot pin 43 extending between the L-shaped brackets 38 and 40. The elongate frame member 14 is received by the socket 42 and is thereby able to pivot about the pivot pin 43 relative to the carriage 12. There is also a releasable locking mechanism 44 which releasably locks the articulation 32 in position by preventing pivoting of the elongate frame member 14 relative to the carriage 12. The locking mechanism 44 includes a recess 46 in at least one of the L-shaped brackets 38. The recess 46 releasably receives a projection 48 which extends radially outward from the socket 42. In this example, the projection 48 is on the elongate frame member 14 and extends through a slot 50 in the socket 42.

In this example, the elongate frame member 14 is reciprocatingly received by the socket 42 and the projection 48 moves along the slot 50 when the elongate frame member reciprocates within the socket 42. A handle 52 on the elongate frame member 14 may be used to reciprocate the elongate frame member 14 within the socket 42 and move the projection 48 along the slot 50. FIG. 7 shows the locking mechanism 44 in a locked position in which the projection 48 is received by the slot 50 so the elongate frame member 14 cannot pivot relative to the carriage 12. FIGS. 8A and 8B show the locking mechanism 44 in a released position in which the projection 48 is free of the recess 46 so the elongate frame member 14 can pivot relative to the carriage 12. The locking mechanism 44 may be actuated using a handle 52 to pull the elongate frame member 14 relative to the socket 42 and thereby move the projection 48 along the slot 50 between the locked position in which the projection is received by the recess 46, as shown in FIG. 7, and the released position in which the projection is free of the recess 46, as best shown in FIG. 8A.

Figure 9:
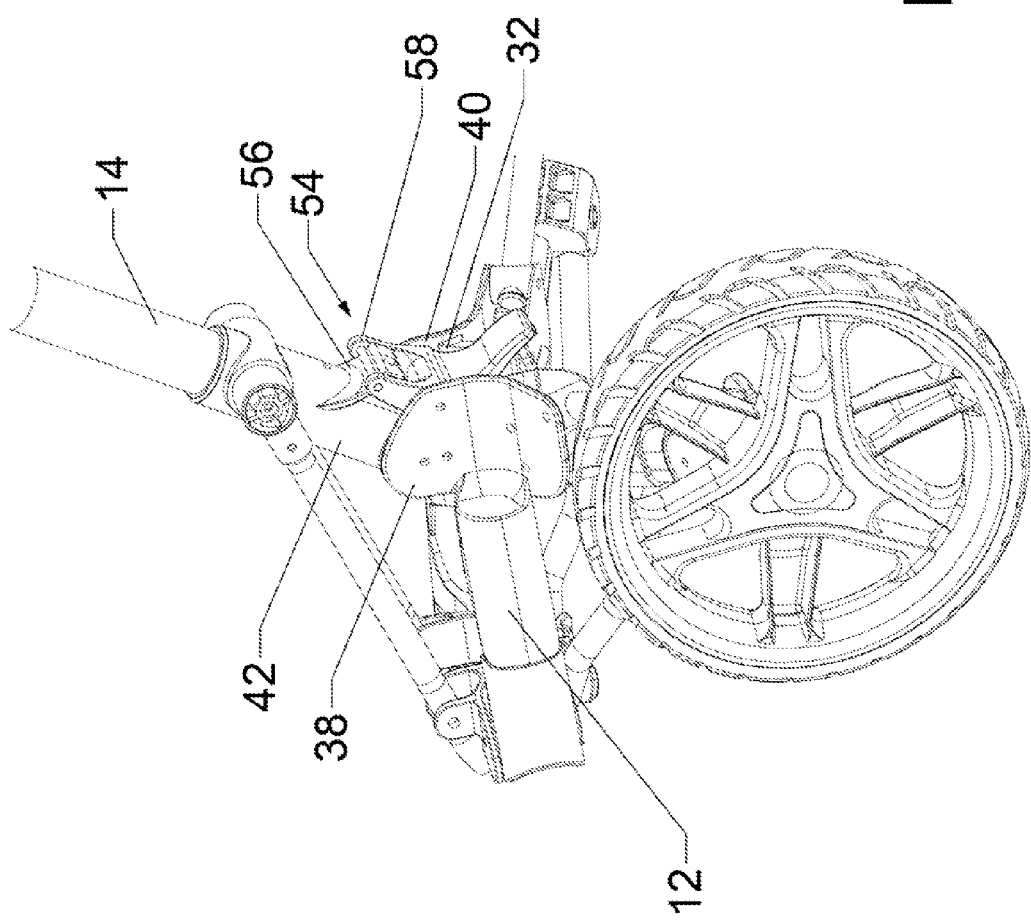
FIG. 9 is a perspective view of an articulation of the golf cart of FIG. 1A which pivotably connects the elongate frame member of the golf cart to a carriage of the golf cart in which an alternative locking mechanism of the articulation is engaged.
Figure 10:
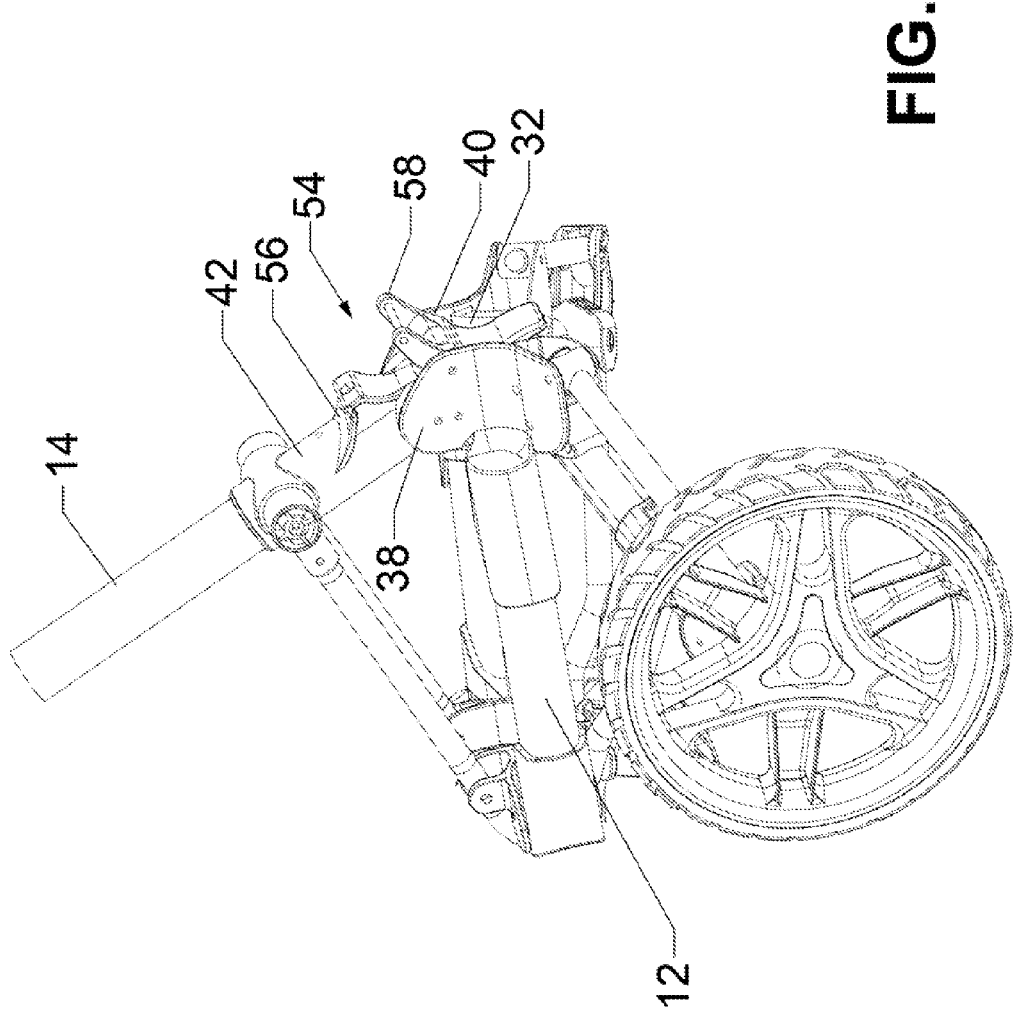
FIG. 10 is a perspective view of an articulation of the golf cart of FIG. 1A which pivotably connects the elongate frame member of the golf cart to a carriage of the golf cart in which an alternative locking mechanism of the articulation is released.

An alternative releasable locking mechanism 54 is shown in FIGS. 9 and 10. The alternative locking mechanism 54 includes a catch 56 and a latch 58. In this example, the catch 56 is on the socket 42 and the latch 58 is pivotably mounted on the carriage 12. FIG. 9 shows the locking mechanism 44 in a locked position in which the latch 58 is engaged with the catch 56 so the elongate frame member 14 cannot pivot relative to the carriage 12. FIG. 10 shows the locking mechanism 44 in a released position in which the latch 58 is free of the catch 56 so the elongate frame member 14 can pivot relative to the carriage 12. The locking mechanism 54 is actuated by pivoting the latch 58.

Figure 11:
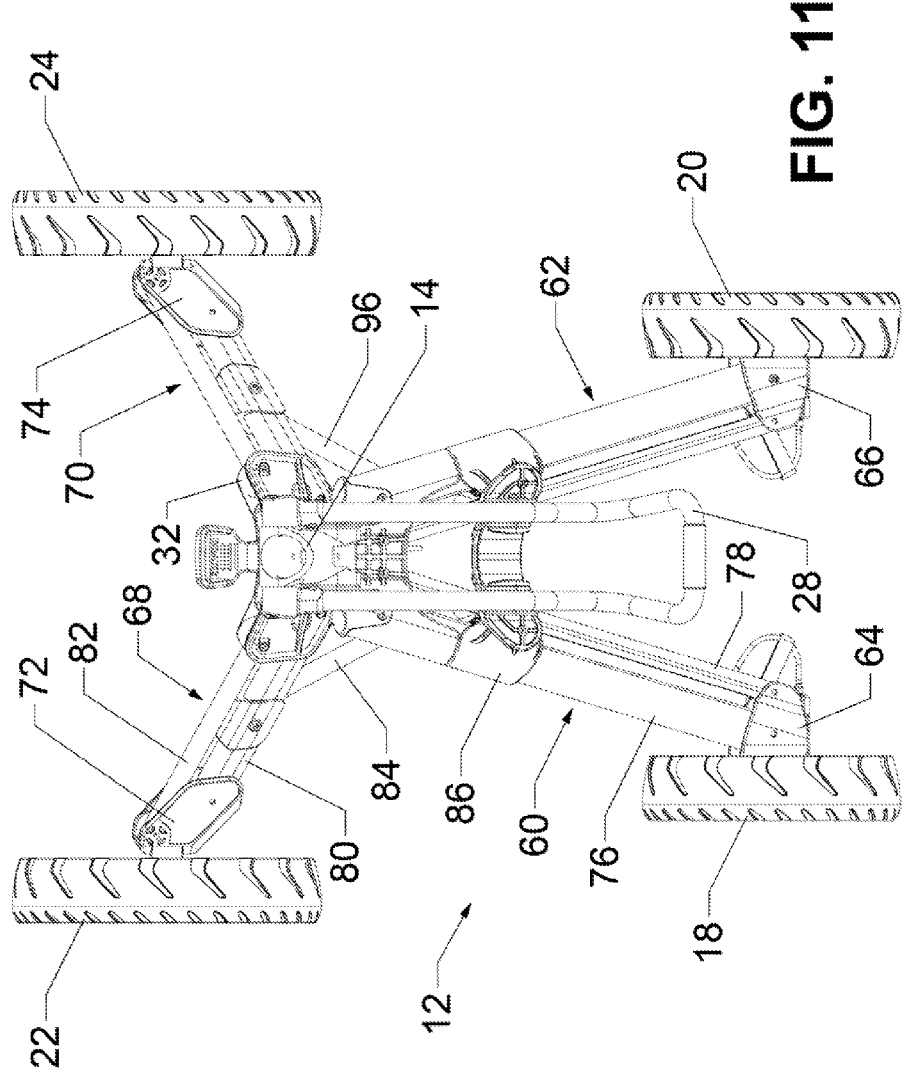
FIG. 11 is a top view of a carriage of the golf cart of FIG. 1A in the extended configuration.

The carriage 12 is shown in greater detail in FIG. 11 and includes a pair of front wheel strut assemblies 60 and 62 which extend between the articulation 32 and respective front wheel mounts 64 and 66 of the front wheels 18 and 20. The carriage 12 also includes a pair of rear wheel struts assemblies 68 and 70 which extend between the articulation 32 and respective rear wheel mounts 72 and 74 of the rear wheels 22 and 24. The front wheel strut assemblies 60 and 62 are minor images of one another and have a substantially identical structure and function in a substantially identical manner. Likewise the rear wheel strut assemblies 68 and 70 are minor images of one another and have a substantially identical structure and function in a substantially identical manner. Accordingly, only the front wheel strut assembly and rear wheel strut assembly on one side of the carriage are described in detail herein with the understanding that the front wheel strut assembly and rear wheel strut assembly on the other side of the carriage have a substantially identical structure and function in substantially identical manner.

The front wheel strut assembly 60 includes a first strut which functions as a load bearing strut 76 and a second strut which functions as a positioning strut 78. The load bearing strut 76 and the positioning strut 78 are substantially parallel to one another. The rear wheel strut assembly 68 also includes a first strut which functions as a load bearing strut 80 and a second strut which functions as a positioning strut 82. The loading bearing strut 80 and the positioning strut 82 are substantially parallel to one another. There is also a linking rod 84 which connects the load bearing strut 80 of the rear wheel strut assembly 68 to a collapsing mechanism 86 which is slidable along the front wheel strut assemblies 60 and 62. The front wheel strut assemblies 60 and 62 are independently pivotable to allow the alignment of the front wheels 18 and 20 to be adjusted.

The collapsing mechanism 86 is slidably mounted on the front wheel strut assemblies 60 and 62. In particular, the collapsing mechanism is slidable or moveable between a first position shown in FIG. 11 and a second position shown in FIG. 13. In the first position the collapsing mechanism 86 is furthest from the front wheel mounts 64 and 66 and the golf cart is then in the extended position. In the second position the collapsing mechanism 86 is nearest to the front wheel mounts 64 and 66 and the golf cart is then in the extended position. The collapsing mechanism moves through intermediate positions, for example the intermediate position shown in FIG. 12, as the collapsing mechanism moves between the first position and the second position.

Figure 12:
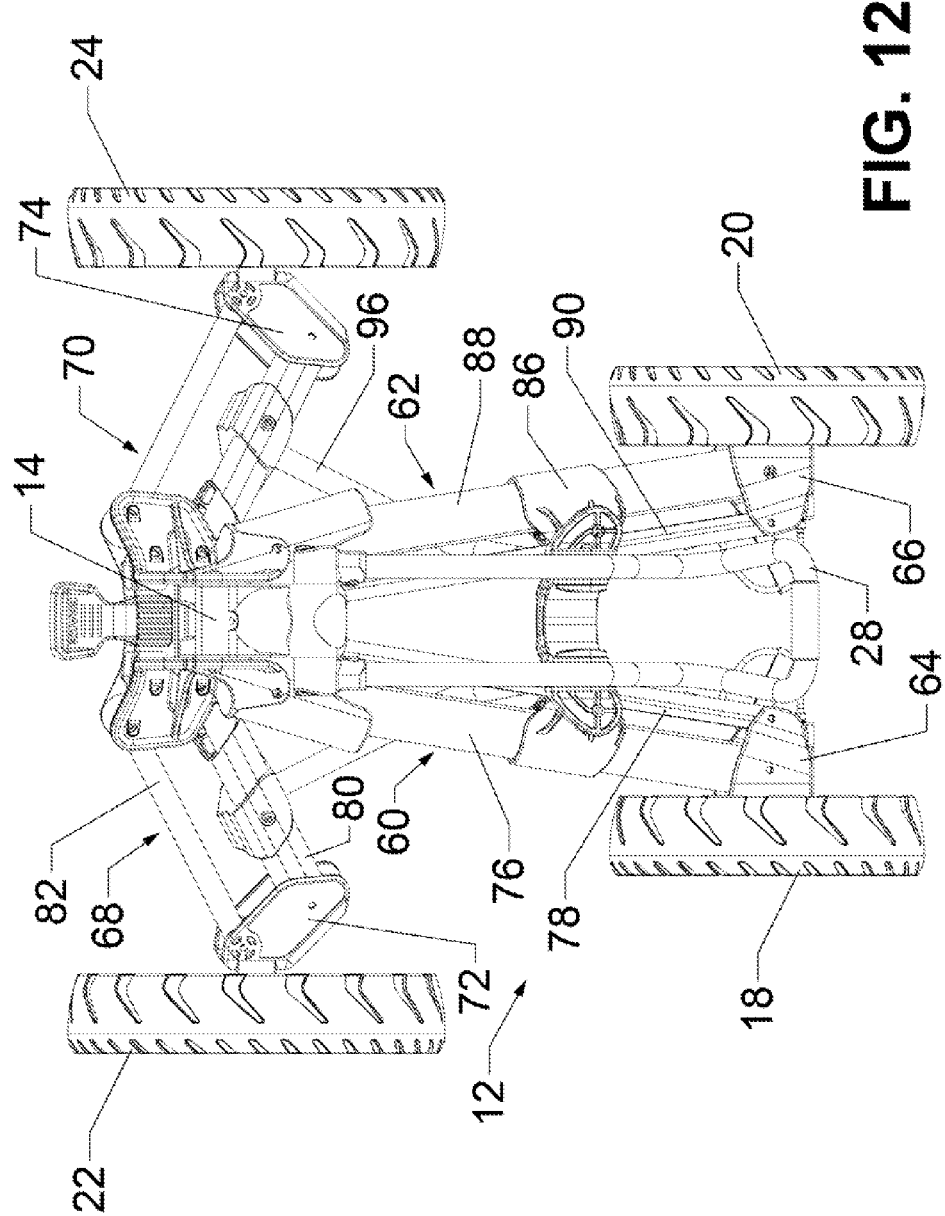
FIG. 12 is a top view of the carriage of the golf cart of FIG. 1A in an intermediate configuration.
Figure 13:
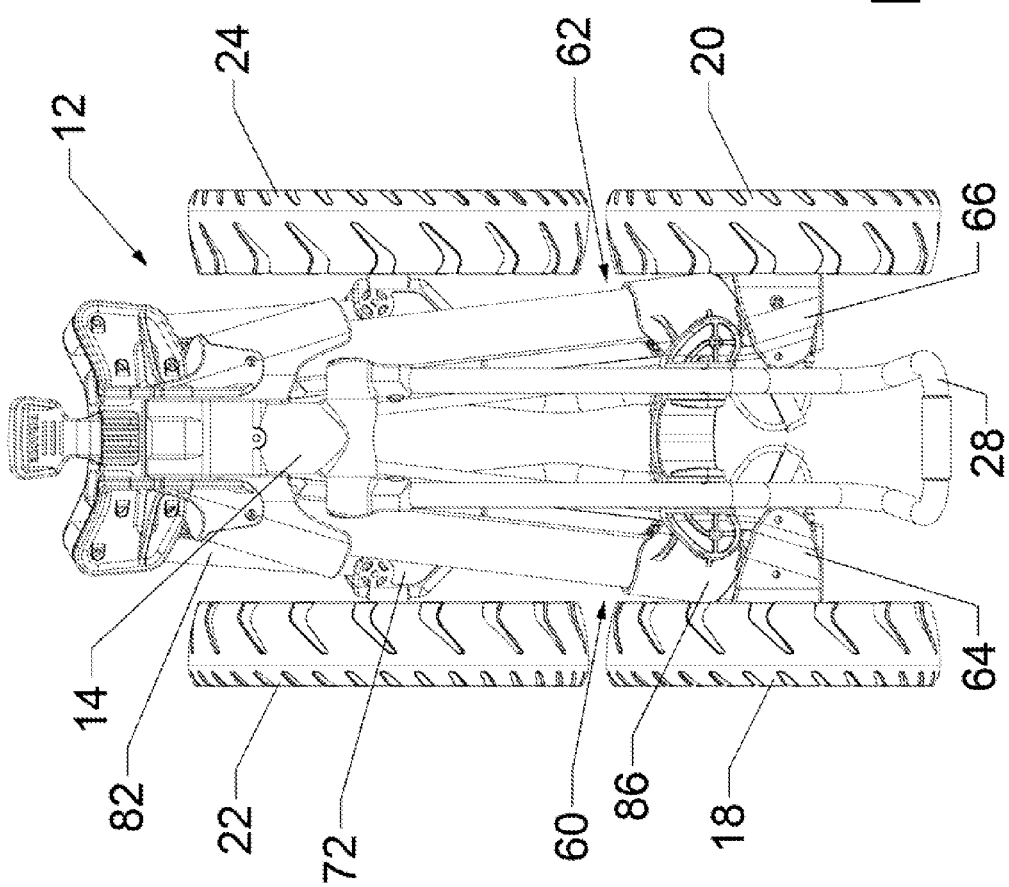
FIG. 13 is a top view of the carriage of the golf cart of FIG. 1A in the retracted configuration.

The collapsing mechanism 86 is actuated to move between the first position and the second position when the elongate frame member 14, shown in fragment in FIGS. 11 to 13, is pivoted relative to the carriage 12. The cradle 28 couples the elongate frame member 14 and the collapsing mechanism 86. Accordingly, when the elongate frame member is pivoted, motion is transmitted through the cradle 28 to the collapsing mechanism 86. The collapsing mechanism 86 moves towards the first position when the elongate frame member 14 is pivoted away from the carriage 12 and the golf cart 10 is being moved from the collapsed configuration to the extended configuration. The collapsing mechanism moves towards the second position when the elongate frame member 14 is pivoted towards the carriage 12 and the golf cart 10 is being moved from the extended configuration to the collapsed position.

Figure 14:
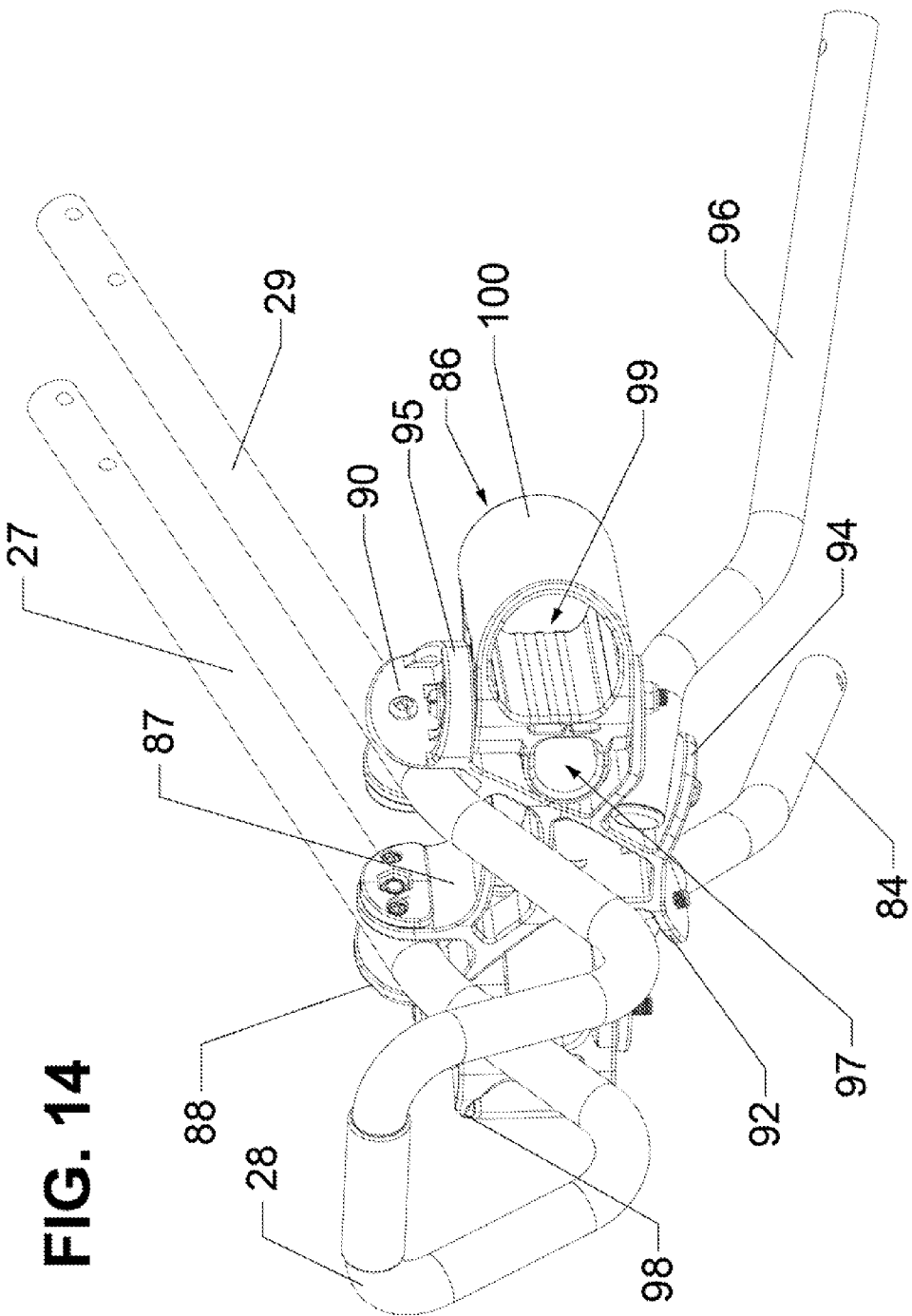
FIG. 14 is a perspective view of a collapsing mechanism of the golf cart of FIG. 1A.

The collapsing mechanism 86, best shown in FIG. 14, includes a main block 87 having devises 88 and 90 which receive respective arms 27 and 29 of the cradle 28. The cradle 28 may be fixedly or releasably connected to the collapsing mechanism 86 by known means, for example, by a bolt or a pin. The collapsing mechanism 86 also includes devises 92 and 94 which receive respective ones of the linking rods 84 and 96 that connect the rear wheel strut assemblies 68 and 70 to the collapsing mechanism as best shown in FIGS. 11 and 12. The linking rods 84 and 96 may be fixedly or releasably connected to the collapsing mechanism 86 by known means, for example, by a bolt or a pin. Movement of the collapsing mechanism 86 accordingly transmits motion to the rear wheel strut assemblies 68 and 70 which are pivotably connected to the carriage 12 and their respective rear wheel mounts 72 and 74.

Referring back to FIG. 14, the collapsing mechanism 86 further includes sub-blocks 98 and 100 which are mirror images of one another and have substantially identical structures and function in a substantially identical manner. Accordingly, only one sub-block is described in detail herein with the understanding that the other sub-block assembly has a substantially identical structure and function in substantially identical manner. The sub-block 100 is received by a clevis 95 of the main block 87 of the collapsing mechanism 86 and the sub-block 100 may be fixedly or releasably connected to the main block 87 by known means, for example, by a bolt or a pin. The sub-blocks 98 and 100 include openings, for example openings 97 and 99 shown for sub-block 100, which respectively and reciprocatingly receive the load bearing strut and positioning strut of a front wheel strut assembly of the golf cart. The collapsing mechanism 86 is thereby able to slide or move along the front wheel strut assemblies as shown in FIGS. 11 to 13.

To move the golf cart 10 from the extended configuration, shown in FIGS. 1A and 1B, and the collapsed configuration, shown in FIG. 4, the locking mechanism 44 of the articulation 32, shown in FIG. 7, which pivotably couples the elongate frame member 14 to the carriage 12 is released and the elongate frame member 14 is pivoted about pin 43 towards the carriage 12 as shown in FIGS. 7, 8A and 8B. As best shown in FIGS. 11 to 13, pivoting of the elongate frame member causes the collapsing mechanism 86 to slide or move along the front wheel strut assemblies 60 and 62. The front wheel strut assemblies 60 and 62 are thereby moved inwardly towards one another when the collapsing mechanism 86 moves from the first position to the second position and the golf cart is thereby moved from the extended configuration to the collapsed configuration. This is possible because the front wheel strut assemblies are pivotable.

The rear wheel strut assemblies 68 and 70 also are moved inwardly towards one another, as shown in FIGS. 11 to 13, when the collapsing mechanism 86 is moved from the first position to the second position and the golf cart is moved from the extended configuration to the collapsed configuration. In this example, the geometries of the rear wheel strut assemblies 68 and 70 change as the collapsing mechanism 86 slides or moves along the front wheel strut assemblies 60 and 62. As shown in FIG. 11, and with reference to the rear wheel strut assembly 68, when the golf cart is in the extended configuration the rear wheel mount 72 is oriented such that it is substantially longitudinally aligned with load bearing strut 80 of the corresponding rear wheel strut assembly 68. However, as shown in FIG. 12, when the collapsing mechanism 86 slides or moves along the front wheel strut assemblies 60 and 62 the rear wheel mount 72 and load bearing strut 80 pivot relative to one another so mount 72 is at a substantial angle relative to the load bearing strut 80. This is as a result of the collapsing mechanism 86 exerting a pulling force on the load bearing strut 80 via the linking rod 84.

The geometry of the rear wheel strut assembly 68 accordingly changes as the rear wheel strut assembly moves through a range of motion. As the collapsing mechanism 86 moves from the first position, shown in FIG. 11, to the second position, shown in FIG. 13, the rear wheel mount 72 and load bearing strut 80 continue to pivot relative to one another until the rear wheel mount 72 is oriented such that it is more substantially longitudinally aligned with the positioning strut 82 as shown in FIG. 13. The above described change in the geometry of the rear wheel strut assembly 68 effectively changes the lengths of the load bearing strut 80 and positioning strut 82. In the extended configuration, shown in FIG. 11, the rear wheel mount 72 may be considered to be a longitudinal extension of the load bearing strut 80 while in the collapsed configuration, shown in FIG. 13, the rear wheel mount 72 may be considered to be a longitudinal extension of the positioning strut 82. Accordingly, the load bearing strut 80 may be considered to be longer in the extended configuration than in the collapsed configuration.

In the extended configuration, shown in FIGS. 1A and 1B and 11, the front wheels 18 and 20 are not aligned with the rear wheels 22 and 24. The golf cart 10 may accordingly have a relative large footprint in the extended configuration which may increase stability. However, in the collapsed configuration, shown in FIGS. 4 and 13, the wheels 18, 20, 22 and 24 the front and rear wheels are substantially aligned on each side of the carriage. The golf cart 10 may accordingly have a relatively small footprint in the collapsed configuration to facilitate storage and shipping. This is a result of the changing geometry of the rear wheel struts 68 and 70.

Figure 15:
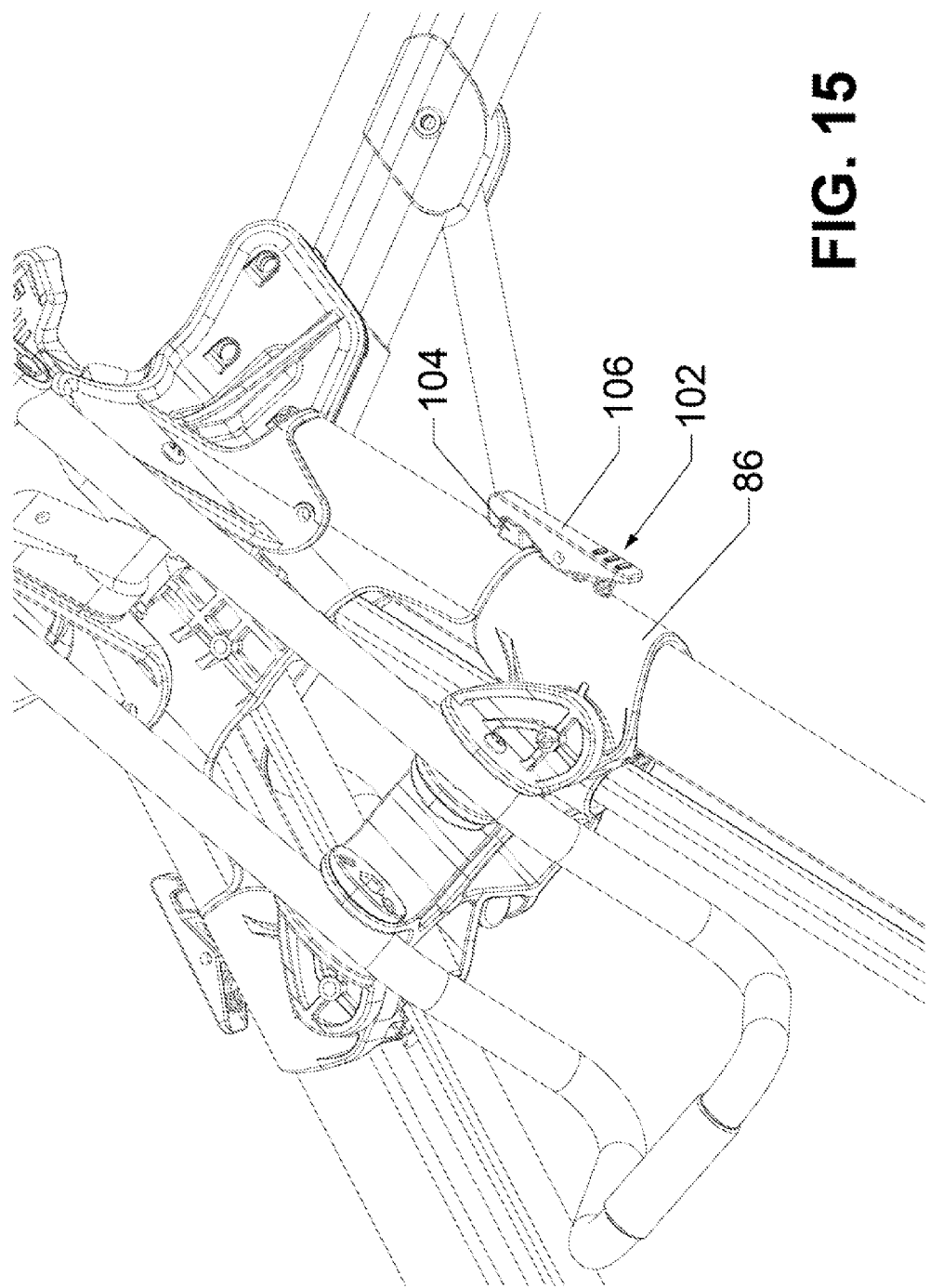
FIG. 15 is a perspective view of a collapsing mechanism of the golf cart of FIG. 1A slidably mounted on front wheel strut assemblies in which the collapsing mechanism is provided with a locking mechanism with the locking mechanism engaged.
Figure 16:
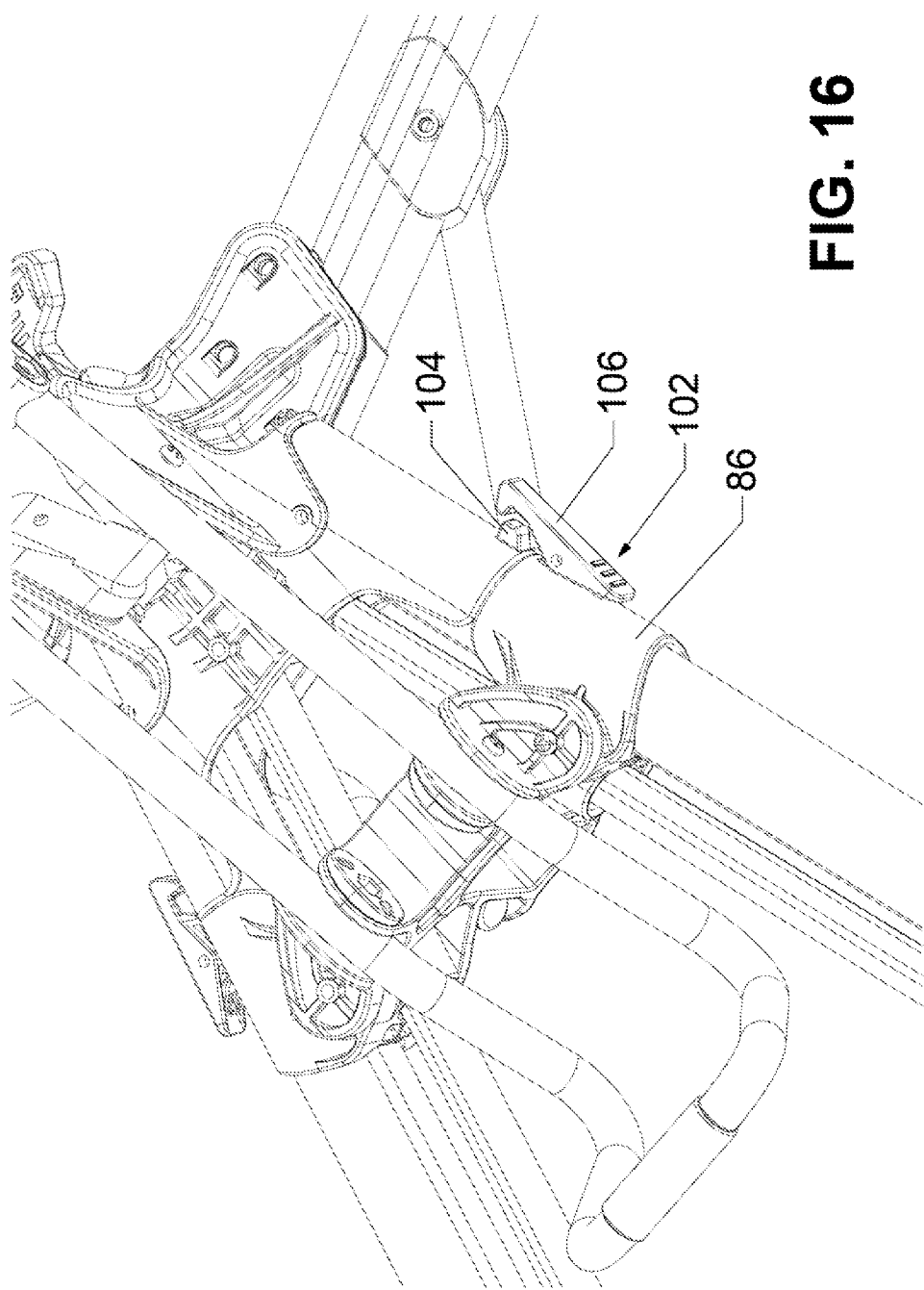
FIG. 16 is a perspective view of a collapsing mechanism of the golf cart of FIG. 1A slidably mounted on front wheel strut assemblies in which the collapsing mechanism is provided with a locking mechanism with the locking mechanism released.

The golf cart 10 is generally maintained in the extended configuration by the locking mechanism 44 of the articulation 32 which pivotably couples the elongate frame member 14 to the carriage 12. Pivoting of the elongate frame member 14 about the pivot pin 43, shown in FIG. 7, towards the carriage 12 is restricted when the locking mechanism 44 is engaged. Sliding or movement of the collapsing mechanism 86 along the front wheel strut assemblies 60 and 62 is accordingly also restricted as the collapsing mechanism is coupled to the elongate frame member 14. However, as shown in FIGS. 15 and 16, the collapsing mechanism 86 may be also or alternatively provided with a locking mechanism 102 to restrict movement of the collapsing mechanism 86. When the latch 106 engages the catch 104, as shown in FIG. 15, sliding of the collapsing mechanism 86 is inhibited. The locking mechanism 102 includes a catch 104 and latch 106 in this example but any suitable locking mechanism may be used.

Figure 17:
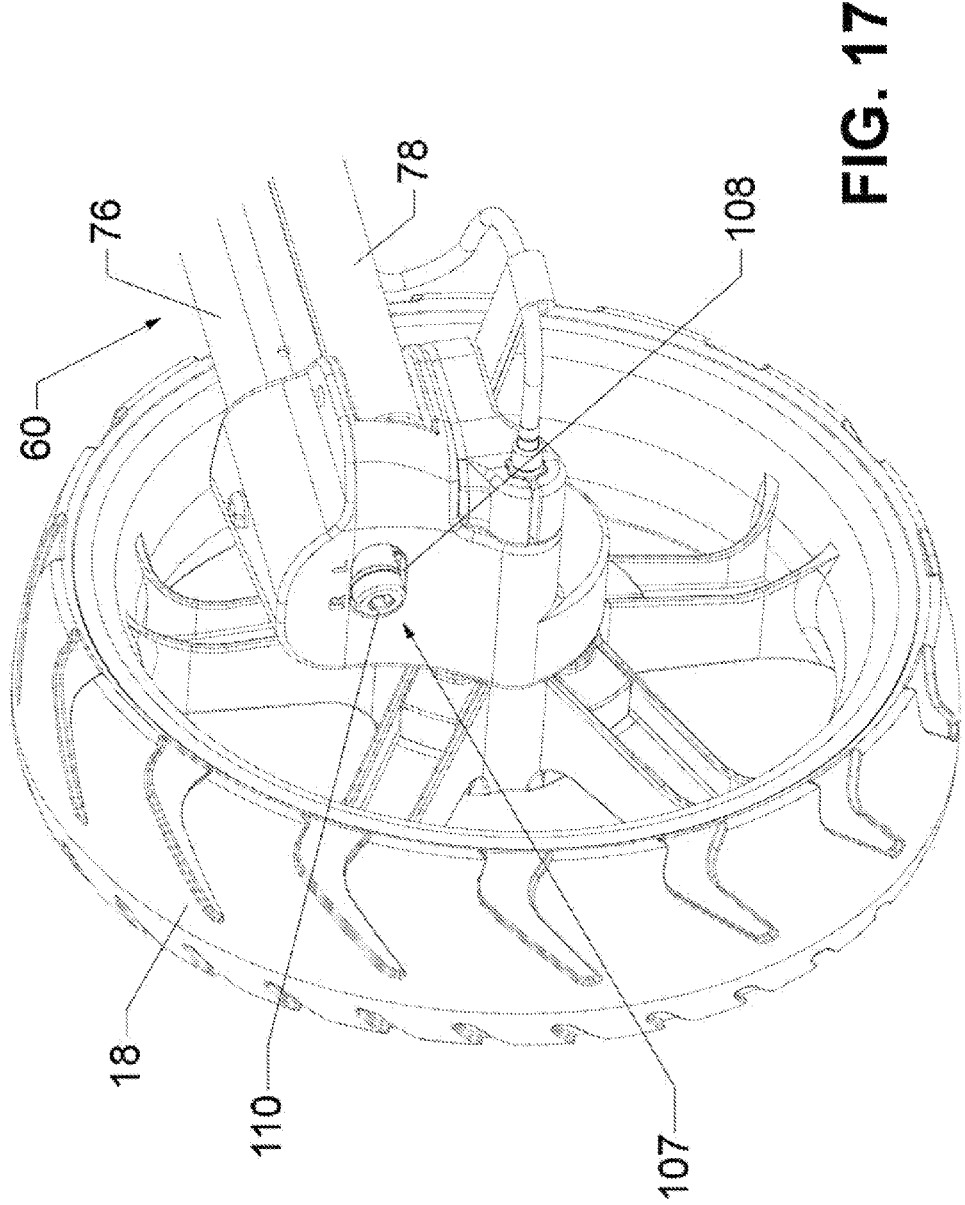
FIG. 17 is a perspective view of a wheel alignment assembly of one of the front wheels of the golf cart of FIG. 1A.

The front wheels may each be provided with a wheel adjustment assembly, for example, wheel adjustment assembly 107 shown in FIG. 17 for one of the front wheels 18. The wheel adjustment assembly 107 includes a slot 108 in the front wheel mount 64 and a projection 110 extending through the slot 108. The projection 110, which in this example is a bolt, is threaded into the load bearing strut 76 of the front wheel strut assembly. The projection 110 is moveable along the slot 108 when the bolt is loosened. Movement of the projection 110 along the slot 108 allows for play of the front wheel 18 and thereby allows the tracking of the golf cart to be adjusted to make up for manufacturing tolerances and damage done to the golf cart during use.

Figure 18:
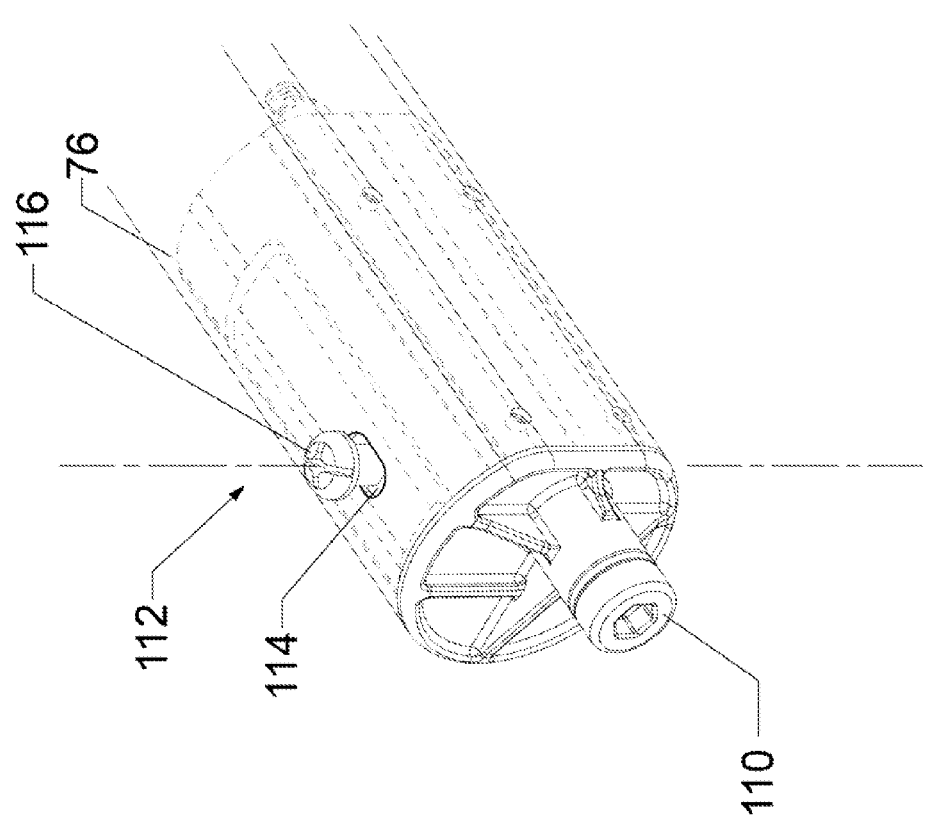
FIG. 18 is a perspective view of a wheel strut adjustment assembly a front wheel strut of FIG. 1A.

The front wheel strut assemblies are also each provided with a strut adjustment assembly, for example, strut adjustment assembly 112 shown in FIG. 18 for the load bearing strut 76 of one of the front wheel strut assemblies. The strut adjustment assembly includes a slot 114 in the load bearing strut 76 and a projection 116 extending through the slot 114. The projection 116, a bolt in this example, is coupled to the projection 110 and is moveable along the slot 114 when the bolt is loosened. Rotation of the projection 110 allows the projection 116 to move along the slot 114 and alters the position of the projection 116, thereby altering the length of load bearing strut 76 relative to positioning strut 78. This causes the wheel adjustment assembly 107 to change direction and allows for the tracking of the front wheels of golf cart 10 to be adjusted.

Figure 19:
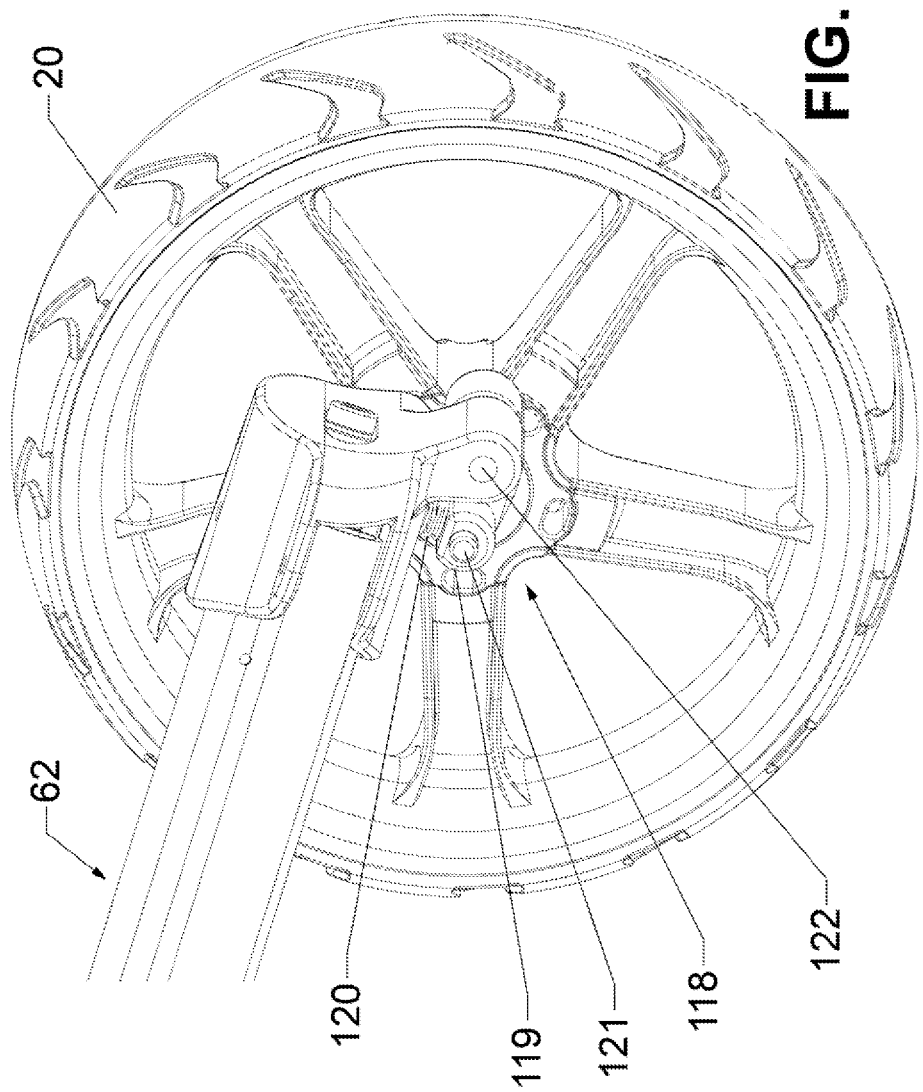
FIG. 19 is a perspective view of a suspension and a front wheel of the golf cart of FIG. 1A.

The front wheels may also each be provided with a suspension assembly, for example, the suspension assembly 118 shown in FIG. 19 for one of the front wheels 20. The suspension assembly 118 includes a resilient member which, in this example, is in the form of a coil spring 120 disposed between the front wheel strut assembly 62 and a portion 119 of the front wheel mount 66 which receives an axle 121 of the front wheel 20. The front wheel mount 66 includes a pivotable coupling 122 which provides the wheel 20 with arcuate play relative to the front wheel strut assembly 62. The suspension assembly together with the arcuate play allow the position of the front wheel 20 to self adjust in response to the terrain.

Figure 20:
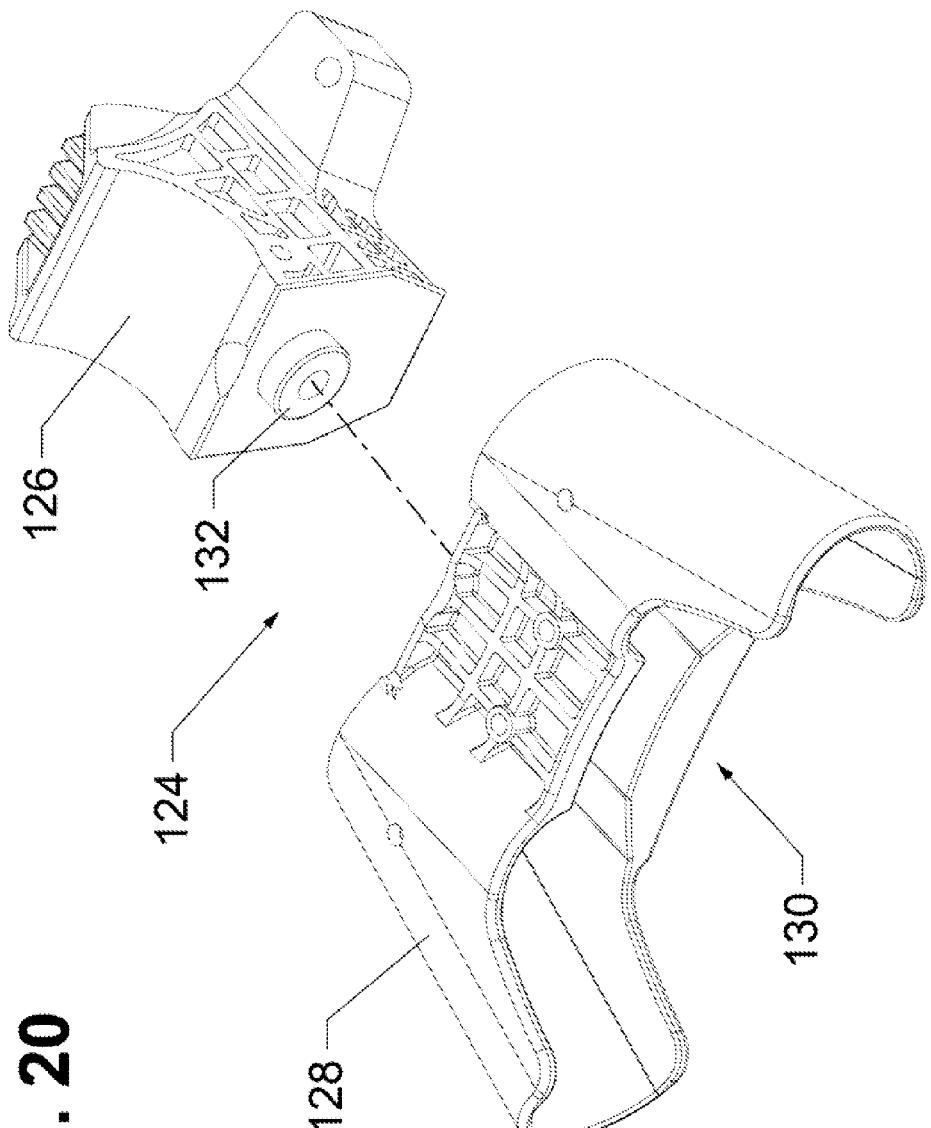
FIG. 20 is an exploded view of a swivel assembly of the golf cart of FIG. 1A.
Figure 21:
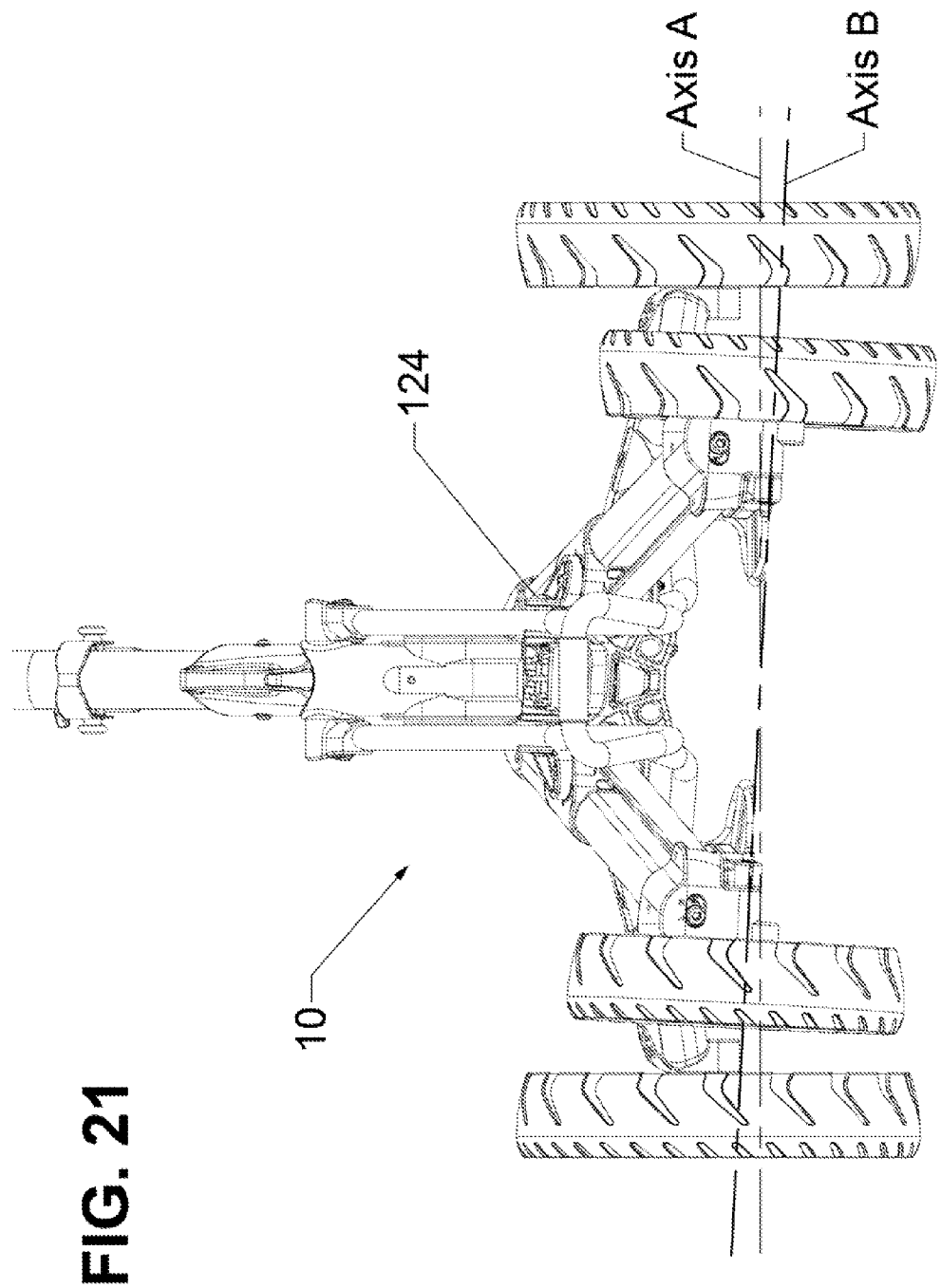
FIG. 21 is a front view of the golf cart of FIG. 1A showing operation of the swivel assembly.

The golf cart 10 may also be provided with a swivel assembly 124 which is shown in FIG. 20. The swivel assembly includes a stationary part 126 and a movable part 128. The stationary part 126 is coupled to the rear wheel strut assemblies 68 and 70, as shown in FIG. 21, while the movable part 128 is provided with a recess 130 which receives the front wheel strut assemblies 60 and 62 and thereby couples the movable part 128 to the front wheel strut assemblies. The stationary part 126 of the swivel assembly 124 is provided with a cylindrical projection 132 upon which the movable part 128 of the swivel assembly 124 is pivotably mounted. Accordingly, as shown in FIG. 21, the front wheel strut assemblies may pivot relative to the rear wheels strut assemblies resulting in temporary offsetting of the front wheels 18 and 20 relative to the rear wheels 22 and 24 as best illustrated by axes A and B. This is useful when the golf cart 10 is travelling over uneven terrain.

Figure 22:
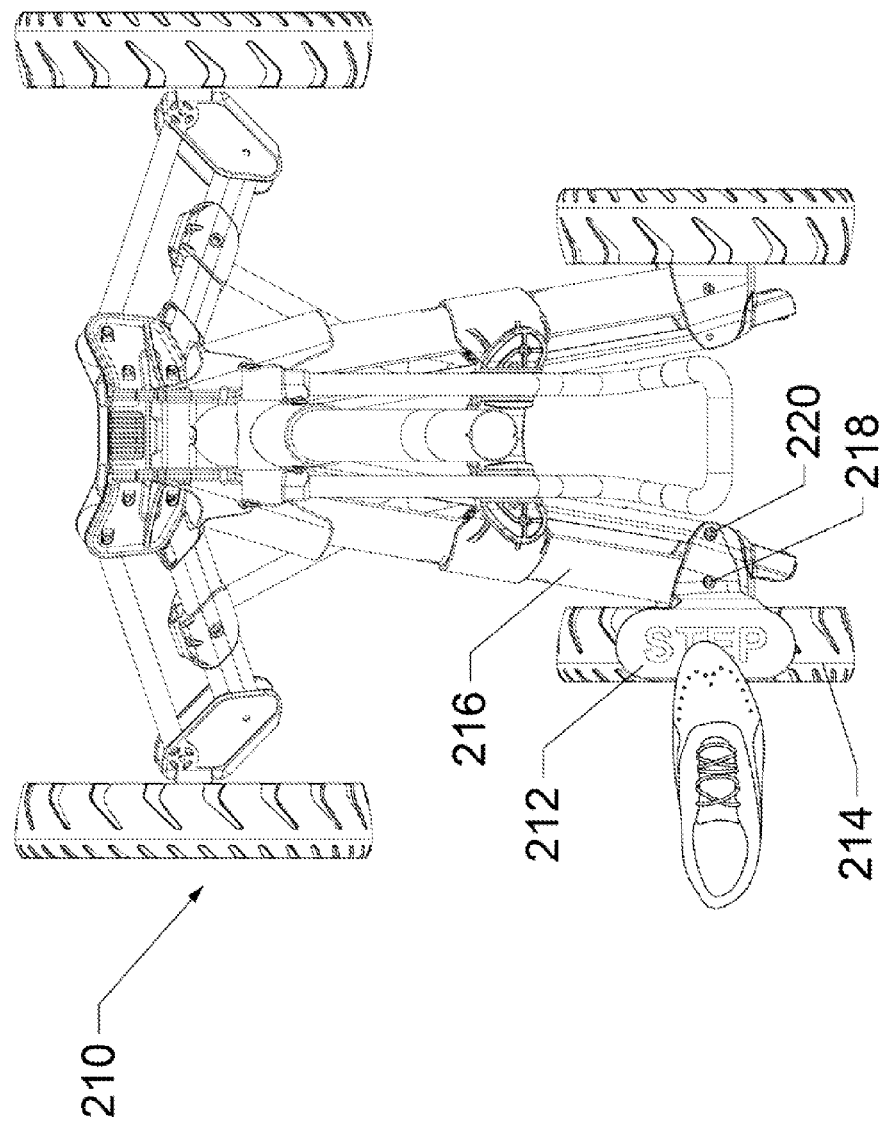
FIG. 22 is a top view of a carriage of another improved collapsible golf cart in an intermediate configuration.

Another improved collapsible four wheel golf cart 210 is shown in FIG. 22. The golf cart 210 shown in FIG. 22 is substantially identical to the golf cart 10 shown in FIG. 1 with the exception that the golf cart 210 shown in FIG. 22 is further provided with a brake mechanism 212 for arresting rotations of a front wheel 214 thereof. The brake mechanism 212 is mounted by bolts 218 and 220 to a front wheel strut assembly 216 upon which the front wheel 214 is also rotatably mounted. This is shown in greater detail in FIG. 23. The brake mechanism is best shown in FIGS. 24 and 25 and generally includes a brake shoe 222 and a mounting plate 224. There are apertures 226 and 228 in the mounting plate through which the bolts 218 and 220 extend as shown in FIG. 23. Referring back to FIG. 25, there is a plurality of ridges, for example ridges 230a and 230b, on the brake shoe. The ridges 230a and 230b engage the front wheel 214 to arrest rotation of the front wheel when the brake mechanism 212 is engaged.

FIG. 26 shows the brake mechanism in a released position in which the front wheel 214 is free to rotate. FIG. 27 shows the brake mechanism 212 in an engaged position in which the rotation of the front wheel 214 is arrested. The brake mechanism 212 is made of a resilient material and is biased to the released position shown in FIG. 26. The brake mechanism 212 may be selectively actuated to the engaged position though the application of downward force to the brake shoe 222. In FIG. 27 a foot 232 of a user applies the downward force to the brake shoe causing the ridges, shown in FIG. 25, to frictionally engage the front wheel 214 and arrest rotation of the front wheel. The brake mechanism 212 facilitates the collapsing and extending of the golf cart 210 by preventing forward and rearward motion of the golf cart 210 as it is being collapsed or extended.

It will be understood by a person skilled in the art that many of the details provided above are by way of example only, and are not intended to limit the scope of the invention which is to be determined with reference to the following claims.

What is claimed is:

1. A collapsible golf cart comprising:
   a frame member;
   a handle connected to the frame member,
   a carriage, the frame member being pivotably coupled to the carriage and the carriage having a pair of front wheel strut assemblies and a pair of rear wheel strut assemblies with respective front wheels mounted on each of the front wheel strut assemblies and respective rear wheels mounted on each of the rear wheel strut assemblies; and
   a collapsing mechanism movable along the front wheel strut assemblies between a first position and a second position, the front wheel strut assemblies being moved inwardly towards one another when the collapsing mechanism moves from the first position to the second position, wherein when the collapsing mechanism is in the first position the golf cart is in an extended configuration in which corresponding ones of the front wheels and the rear wheels are offset with respect to one another, and, when the collapsing mechanism is in the second position, the golf cart is in a collapsed configuration in which corresponding ones of the front wheels and the rear wheels are substantially aligned with respect to one another.

2. The collapsible golf cart as claimed in claim 1 wherein each of the front wheel strut assemblies includes a load bearing strut and a positioning strut, and wherein the load bearing strut of each front wheel strut assembly is adjustable.

3. The collapsible golf cart as claimed in claim 1 wherein the front wheel strut assemblies are independently pivotable.

4. The collapsible golf cart as claimed in claim 1 wherein the front wheels are self adjustable.

5. The collapsible golf cart as claimed in claim 1 wherein each of the rear wheel strut assemblies includes a load bearing strut and a positioning strut which are both pivotally connected to a respective rear wheel mount, and wherein a geometry of the rear wheel strut assemblies changes when the collapsible golf cart is moved between the extended configuration and the collapsed configuration such that each rear wheel mount is longitudinally aligned with its corresponding said load bearing strut when the golf cart is in the extended configuration and each said rear wheel mount is longitudinally aligned with its corresponding said positioning strut when the golf cart is in the collapsed configuration.

6. The collapsible golf cart as claimed in claim 1 wherein the rear wheel strut assemblies are each coupled to the collapsing mechanism by a corresponding linking rod such that motion is transmitted to the rear wheel strut assemblies when the collapsing mechanism moves along the front wheel strut assemblies.

7. The collapsible golf cart as claimed in claim 1 wherein the frame member is coupled to the collapsing mechanism such that pivoting of the frame member relative to the carriage causes the collapsing mechanism to move along the front wheel strut assemblies.

8. The collapsible golf cart as claimed in claim 7 wherein a cradle for a golf bag couples the frame member to the collapsing mechanism.

9. The collapsible golf cart as claimed in claim 1 further including a releasable locking mechanism for restricting movement of the collapsing mechanism.

10. The collapsible golf cart as claimed in claim 1 wherein an articulation with a releasable locking mechanism pivotably couples the frame to the carriage.

11. The collapsible golf cart as claimed in claim 1 wherein the handle is pivotably coupled to the frame member.

12. The collapsible golf cart as claimed in claim 1 wherein an articulation with a releasable locking mechanism pivotably couples the handle to the frame member.

13. The collapsible golf cart as claimed in claim 1 further including a brake mechanism for arresting rotation of one of the front wheels, the brake mechanism comprising:
- a brake shoe provided with a plurality of ridges which engage said one of the front wheels when the brake mechanism is in an engaged position; and
- a mounting plate for mounting the brake mechanism to the golf cart, wherein the brake mechanism is resilient and is biased towards a released position, and wherein the brake mechanism may be actuated to the engaged position by applying a downward force to the brake shoe.

* * * * *